United States Patent
Hansen

(10) Patent No.: US 9,017,510 B2
(45) Date of Patent: Apr. 28, 2015

(54) METHOD AND APPARATUS FOR FABRICATING LARGE SCALE INTEGRATED AIRFOILS

(75) Inventor: Martin Wayne Hansen, Edgewood, WA (US)

(73) Assignee: The Boeing Company, Chicago, IL (US)

( * ) Notice: Subject to any disclaimer, the term of this patent is extended or adjusted under 35 U.S.C. 154(b) by 661 days.

(21) Appl. No.: 13/324,254

(22) Filed: Dec. 13, 2011

(65) Prior Publication Data

US 2013/0149164 A1 Jun. 13, 2013

(51) Int. Cl.
*B29C 65/00* (2006.01)
*B32B 37/00* (2006.01)
*B64C 1/00* (2006.01)
*B64C 3/00* (2006.01)
*B64C 5/00* (2006.01)
*B29C 65/02* (2006.01)
*B29C 65/48* (2006.01)
*B29C 65/50* (2006.01)
(Continued)

(52) U.S. Cl.
CPC ........... *B64F 5/0009* (2013.01); *B29C 35/0227* (2013.01); *B29C 65/02* (2013.01); *B29C 65/4835* (2013.01); *B29C 65/5042* (2013.01); *B29C 65/7841* (2013.01); *B29C 65/7855* (2013.01); *B29C 66/112* (2013.01); *B29C 66/114* (2013.01); *B29C 66/12464* (2013.01); *B29C 66/131* (2013.01); *B29C 66/43441* (2013.01); *B29C 66/71* (2013.01); *B29C 66/721* (2013.01); *B29C 66/7212* (2013.01); *B29C 66/73751* (2013.01); *B29C 66/73755* (2013.01); *B29C 66/73756* (2013.01); *B29C 70/44* (2013.01); *B29C 70/46* (2013.01); *B29K 2063/00* (2013.01); *B29K 2307/04* (2013.01); *B29L 2031/3085* (2013.01); *B64C 3/185* (2013.01); *B64C 3/26* (2013.01); *Y02T 50/433* (2013.01); *Y02T 50/90* (2013.01); *Y10T 156/17* (2015.01)

(58) Field of Classification Search
CPC ........... B64C 1/00; B64C 1/06; B64C 1/065; B64C 1/069; B64C 1/12; B64C 3/00; B64C 3/18; B64C 3/185; B64C 3/20; B64C 3/22; B64C 3/24; B64C 3/26; B64C 5/00; B64C 5/06; B64C 5/08; B64C 2001/0054; B64C 2001/0072; B32B 37/00; B29C 65/00
USPC ............... 156/285, 286, 382; 244/119, 123.1, 244/123.8, 123.7
See application file for complete search history.

(56) References Cited

U.S. PATENT DOCUMENTS 5,087,187 A 2/1992 Simkulak et al.
5,454,895 A 10/1995 Imparato
(Continued)

FOREIGN PATENT DOCUMENTS

EP 1070661 A2 1/2001
WO WO2008020158 A2 2/2008

OTHER PUBLICATIONS

Extended European Search Report, dated May 3, 2013, regarding Application No. EP12196759.0, 7 pages.

*Primary Examiner* — Richard Crispino
*Assistant Examiner* — Matthew Hoover
(74) *Attorney, Agent, or Firm* — Yee & Associates, P.C.

(57) ABSTRACT

An airfoil is fabricated by assembling cured skins with spars having cured spar webs and uncured spar chords. The skins are bonded to the spars by curing the spar chords.

18 Claims, 32 Drawing Sheets

(51) Int. Cl.
*B29C 65/78* (2006.01)
*B29C 70/44* (2006.01)
*B64C 3/18* (2006.01)
*B64C 3/26* (2006.01)
*B64F 5/00* (2006.01)
*B29C 35/02* (2006.01)
*B29C 70/46* (2006.01)
*B29K 63/00* (2006.01)
*B29K 307/04* (2006.01)
*B29L 31/30* (2006.01)

(56) References Cited

U.S. PATENT DOCUMENTS

| | | | |
|---|---|---|---|
| 6,190,484 | B1 | 2/2001 | Appa |
| 6,217,000 | B1 | 4/2001 | Younie et al. |
| 6,502,788 | B2 * | 1/2003 | Noda et al. ............ 244/123.3 |
| 6,513,757 | B1 | 2/2003 | Amaoka et al. |
| 7,806,367 | B2 * | 10/2010 | Munoz Lopez et al. ... 244/123.7 |
| 2010/0000667 | A1 * | 1/2010 | Funnell ................... 156/189 |

* cited by examiner

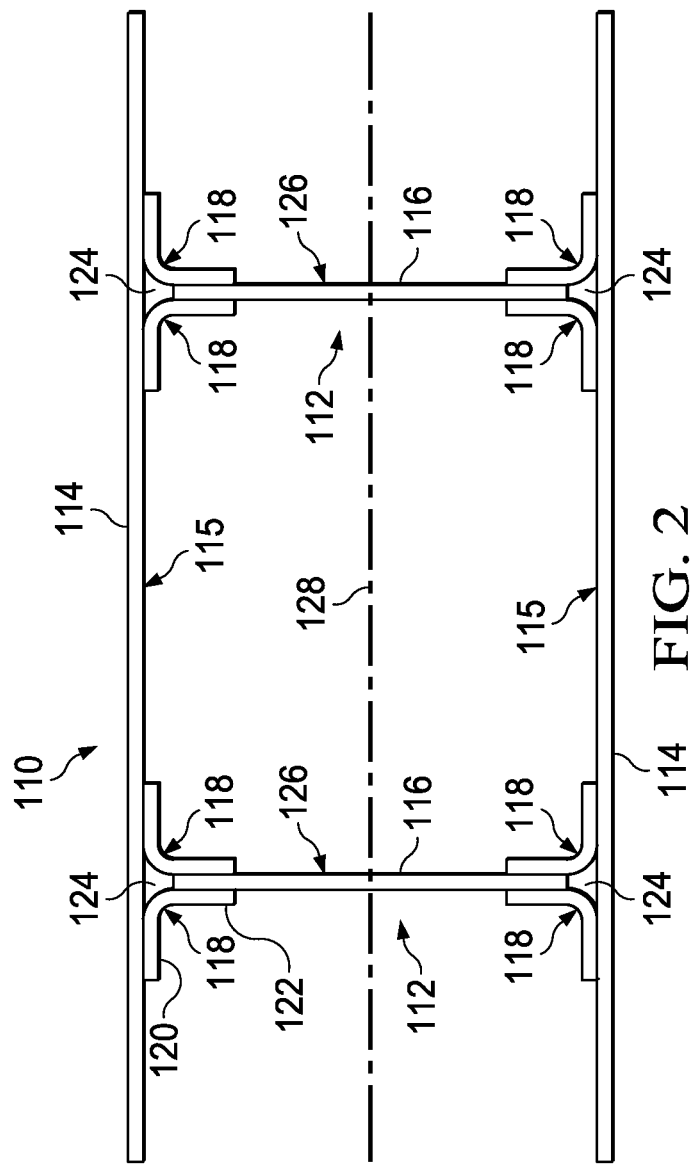

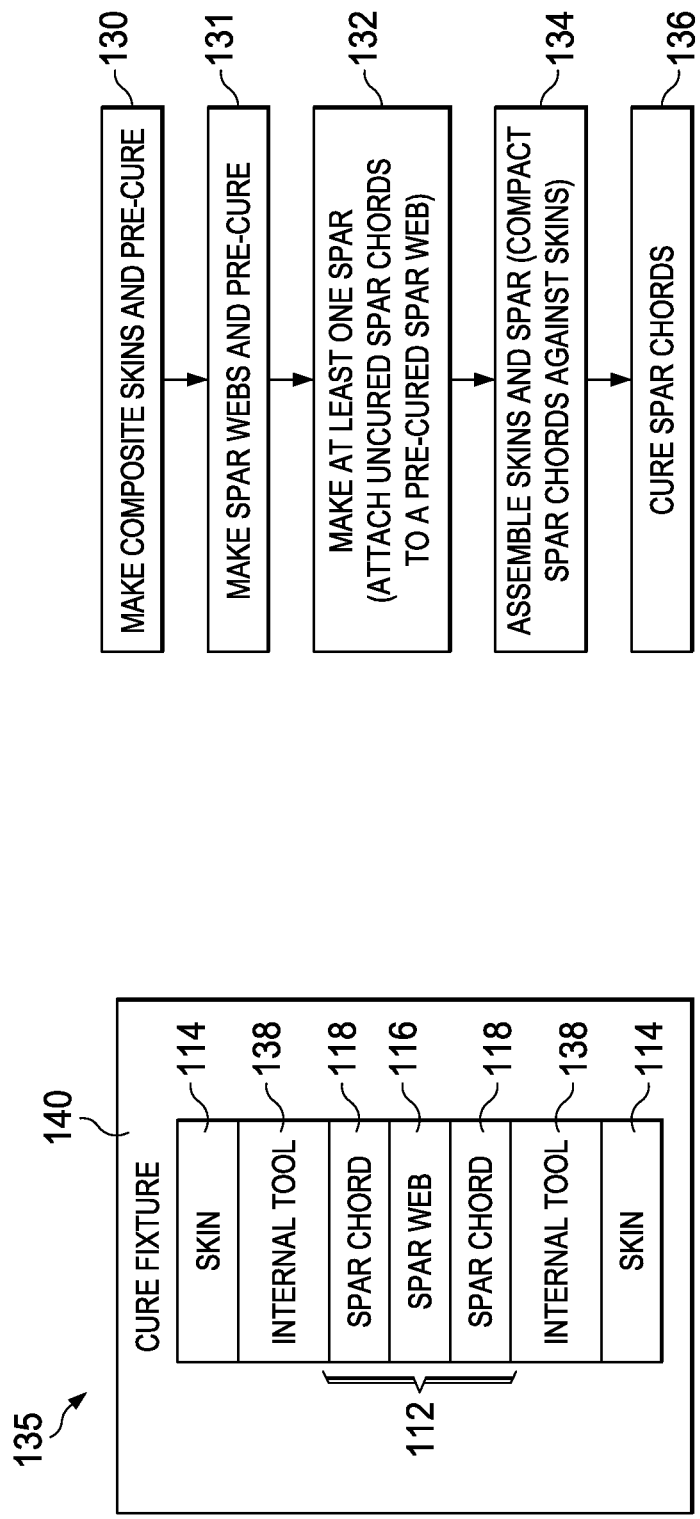

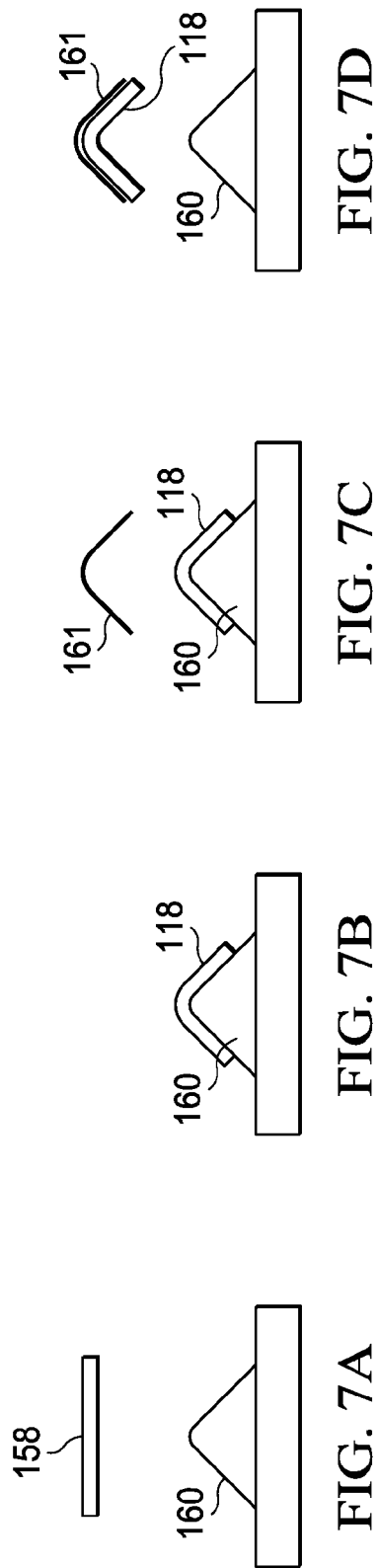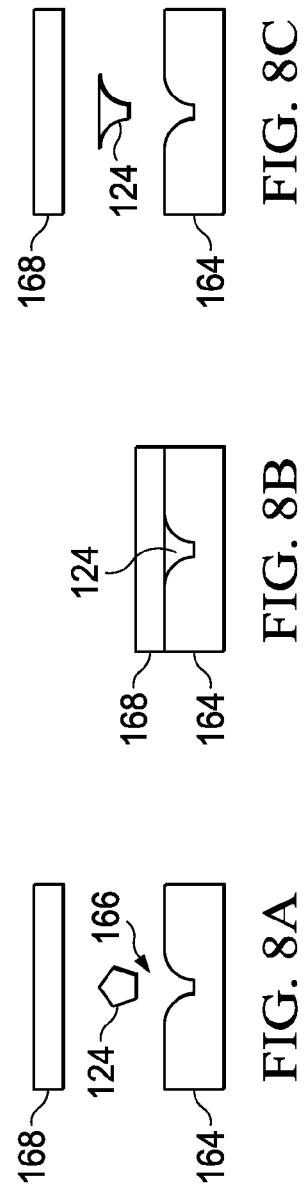

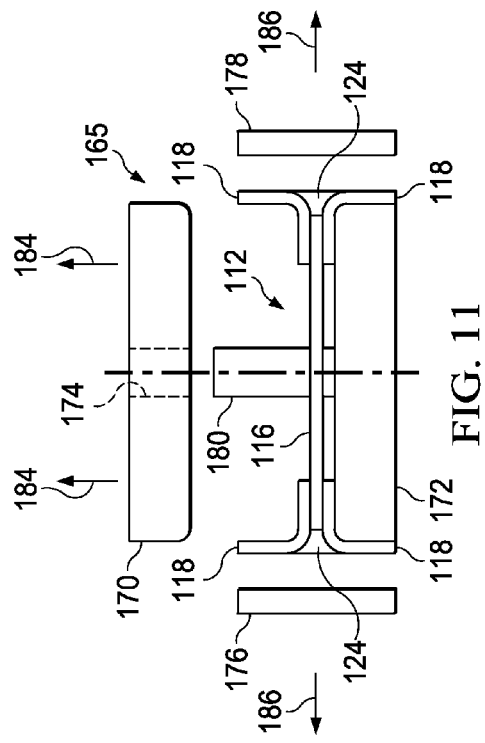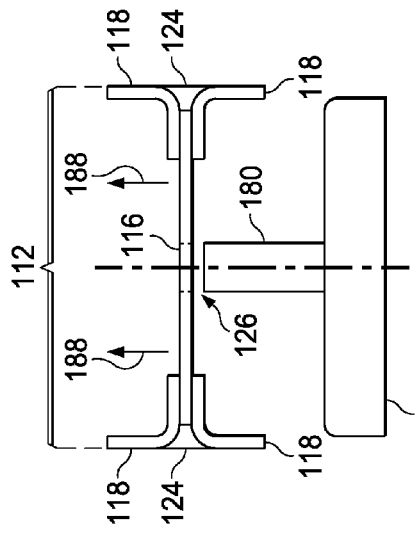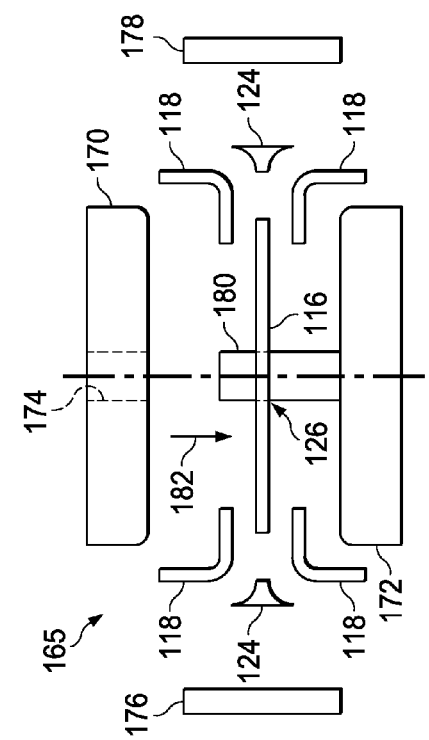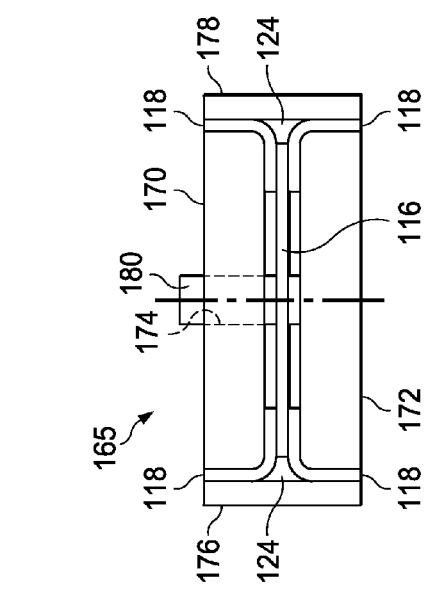

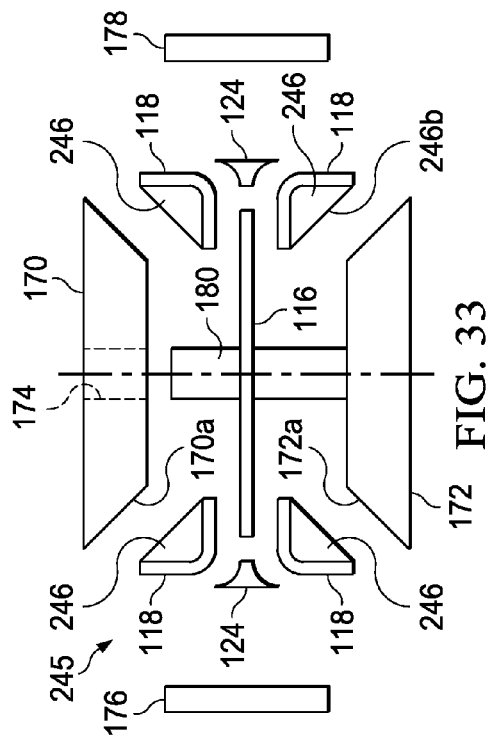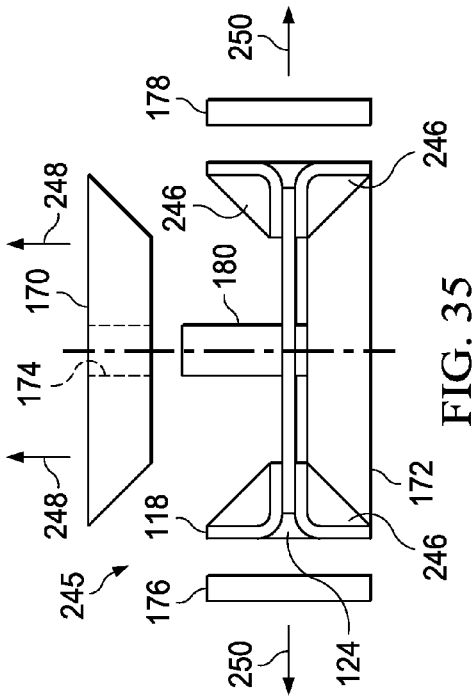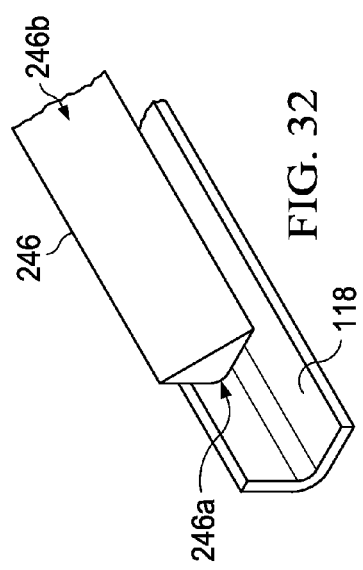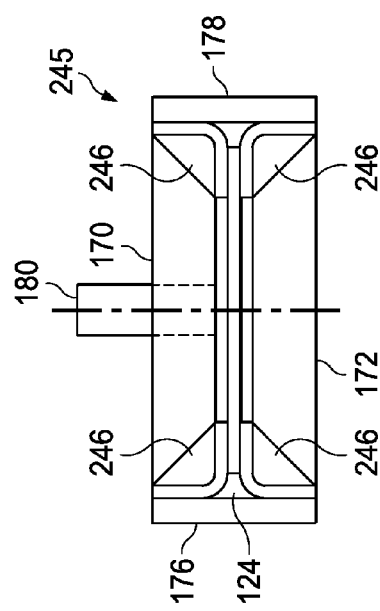

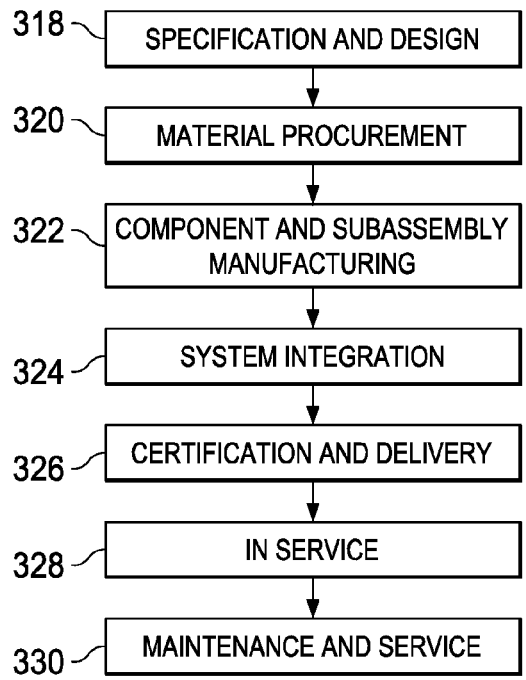
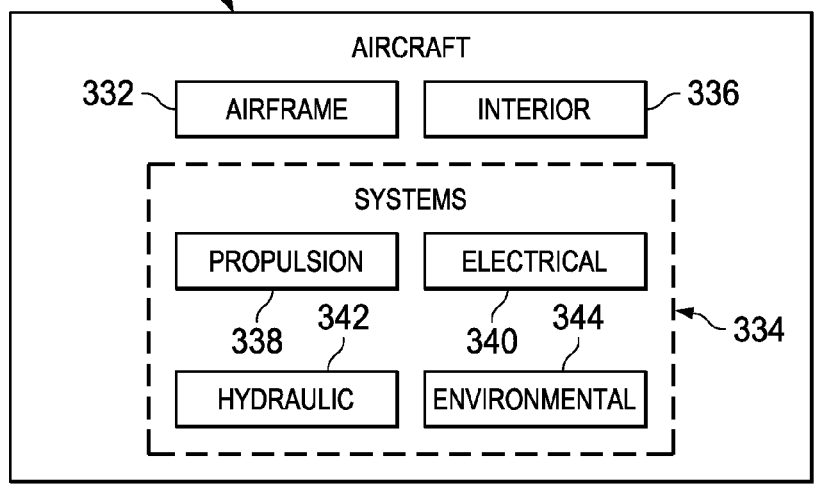

METHOD AND APPARATUS FOR FABRICATING LARGE SCALE INTEGRATED AIRFOILS

BACKGROUND INFORMATION

1. Field

The present disclosure generally relates to techniques and equipment for fabricating airfoils such as wings and stabilizers, and deals more particularly with a method and apparatus for fabricating large scale integrated airfoils formed from composites.

2. Background

Large scale composite airfoil structures, such as wing boxes may be built up using fasteners to mechanically assemble multiple composite components. The use of fasteners has a number of disadvantages, including but not limited to increased part count, higher labor costs for fastener drilling and assembly, added weight to the structure and the susceptibility of fasteners to lighting strikes.

Some of the disadvantages of mechanical assembly using fasteners may be overcome by integrating composite components to reduce part count, however large scale integration of composite structures may present several challenges. For example, although large scale integration may reduce the number of parts, some parts may require special storage, handling and tracking prior to a final bonding operation. These requirements can in turn increase work in process (WIP), tool turns and freezer storage space. Also, the tooling required for large scale integration may be relatively complicated, heavy and costly. For example, it may be difficult to achieve the desired dimensional control of large scale integrated structures without the use of complicated and expensive matched die tooling. Additionally, final bond tooling may require additional heavy and expensive reinforcement structures in order to withstand the forces imposed by autoclave processing.

Large scale integrated structures may require a correspondingly large area of vacuum bagging, which may be labor intensive to install and may present the opportunity for bag leaks that may be difficult to detect and repair prior to curing. Still another challenge presented by large scale integration involves the fact that certain NDI (non-destructive inspection) operations may be carried out only after final cure. NDI performed after the final cure step may not allow early detection of parts requiring rework, and may result in expensive repairs or scrapping of a relatively large part or assembly due to a nonconformity in a relatively small portion.

Accordingly, there is a need for a method and apparatus for fabricating large scale integrated composite structures such as airfoils that reduce the need for large, expensive and/or complicated tooling to maintain dimensional control over assembled parts, while reducing the amount of vacuum bagging that is required during final cure operations. There is also a need for a method and apparatus as mentioned above which may allow early detection of parts requiring rework before they are integrated into a final structure and which may avoid the need to subject large assembled parts to autoclave pressures.

SUMMARY

The disclosed embodiments provide a method and apparatus for fabricating large scale integrated composite structures such as airfoils which employ co-bonding of components in order to reduce or eliminate fasteners and achieve a desired dimensional stability with relatively minimal, light weight tooling. In one embodiment, airfoil boxes are fabricated using pre-cured skins and spar webs that are assembled with uncured spar chords using relatively simple and inexpensive tooling. The pre-cured skins and spars are combined with simple internal tooling in an integrated manner that allows them to function as the final bond tool themselves. Final curing may require autoclave forces to be applied only to the area of the spar cords chords, and the need for the entire assembly to react these large autoclave forces is reduced or eliminated. In some applications, depending on the material systems being used, final curing may be carried out at or near atmospheric pressure in an oven. The final cure tooling requires no OML (outer mold line) definition or extensive support of large structures. During autoclave curing, the uncured spar chords are free to move in response to autoclave pressure which causes the uncured spar chords to adapt and mold themselves to the IML (inner mold line) of the skin, thereby providing good fit-up between the spars and the skin. The use of pre-cured skins and spar webs, along with integrated tooling and special bagging techniques, simplify large scale final cure processing, while greatly reducing the amount of vacuum bagging and associated complex tools. Also, the integrated tooling allows handling and indexing of thin parts such as the spar chords with reduced risk of damage, and provides continuous support of large loose, uncured details (e.g. spar chords) with minimal need for auxiliary equipment. The disclosed method and apparatus allow NDI of composite components before final bonding operations and may significantly reduce the need for rework.

Another advantage of the disclosed embodiments lies in the fact that pre-cured skins and spars can be net trimmed prior to final bonding operations. Left hand and right hand large scale integrated structures can be built on the same final bond fixture. Vacuum bagging is simplified and may carried out using reusable bagging concepts. Final cure cycles may be significantly reduced compared to large typical CFPR (carbon fiber reinforced plastic) integrated structures because of the weight reduction of final bond tooling.

According to one disclosed embodiment, a method is provided of fabricating an airfoil, comprising making a pair of cured composite skins, making at least one spar, including assembling uncured spar chords and at least one cured composite spar web, and assembling the cured skins and the spar and curing the spar chords. The method further comprises compacting the spar chords against the cured skins as the spar chords are being cured. Assembling the skins and the spar includes holding the spar web and the spar chords in a tool, and mounting the skins on the tool with an inner mold line of each of the skins in proximity to the spar chords. Holding the spar web and the spar chords in the tool includes adhering the spar chords to the spar web, and clamping the spar web in the tool. Assembling the cured skins and the spar includes forming holes in each of the skins, and removably mounting the skins on the tool by inserting fasteners through the holes into the tool. Assembling the cured skins and the spar may also include indexing the spar relative to the cured skins by mounting the tool on indexing rods.

According to another disclosed embodiment, a method is provided of fabricating an airfoil box. The method comprises providing a pair of cured composite skins each having a span and assembling at least one composite spar, including attaching uncured composite spar chords to a cured composite spar web. The method further comprises holding the spar and the cured skins in an assembled, indexed relationship to each other along the span, and bonding the spar to the cured composite skins by curing the uncured composite spar chords. The method may further comprise generating a compaction force compacting the spar chords against the spar web and the skins as the spar chords are being cured. Compacting the spar chords may be performed by installing vacuum bags respectively over the spar chords, and evacuating each of the vacuum bags. The skins and the spar webs are used to react the compaction force.

According to still another embodiment, apparatus is provided for fabricating an airfoil box, comprising a tool adapted to hold at least one composite spar between two skins with uncured portions of the spar in proximity to the skins, and a fixture for supporting the tool during curing of the uncured portions of the spar. The tool includes first and second tool portions between which a spar may be clamped and to which the skins may be attached. Each of the tool portions includes at least one vacuum bag for compacting the uncured portions of the spar during the curing. The fixture further includes a plurality of index rods passing through and supporting the tool. The tool has a clamp for clamping the first and second tool portions against the spar.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 2 is an illustration of a sectional view taken along the line 2-2 in FIG. 1.

FIG. 3 is an illustration of an overall functional block diagram of apparatus for fabricating airfoils according to the disclosed embodiments.

FIG. 4 is an illustration of a flow diagram of a method of fabricating an airfoil.

FIGS. 7A-7D are illustrations showing sequential steps for fabricating the web chords.

FIGS. 8A-8C are illustrations showing sequential steps for fabricating the fillers.

FIGS. 9-12 are illustrations of cross sectional views of a compaction tool assembly, showing the sequential steps for assembling and compacting the spar components.

FIG. 32 is an illustration of a perspective view showing a chord compaction tool to aid in compressing the spar chord.

FIGS. 33-36 are illustrations similar to FIGS. 9-12, showing sequential steps for assembling and compacting the spar components using the chord compaction tool shown in FIG. 32.

FIG. 50 is an illustration of a flow diagram of aircraft production and service methodology.

FIG. 51 is an illustration of a block diagram of an aircraft.

DETAILED DESCRIPTION

Figure 1:
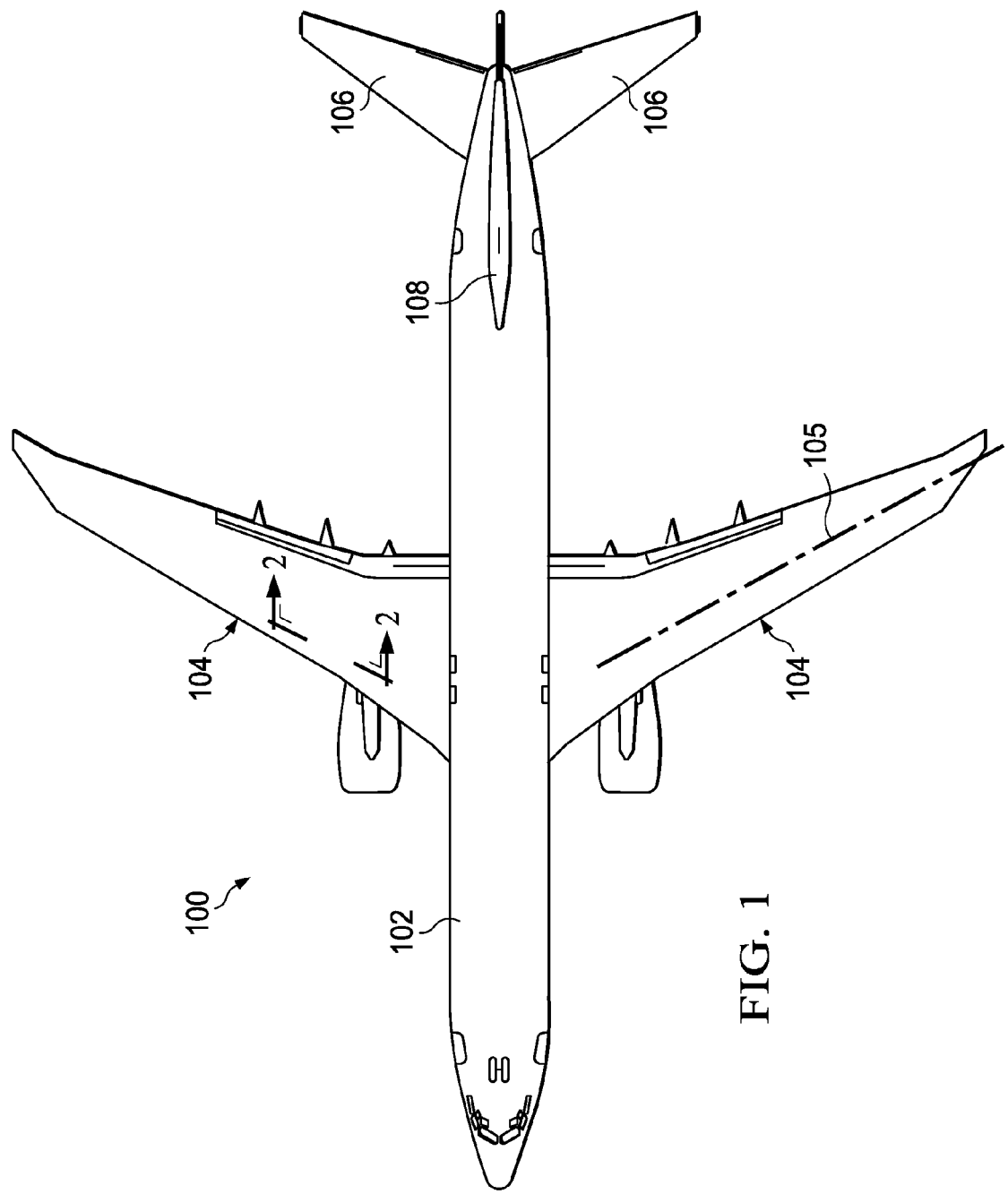
FIG. 1 is an illustration of an aircraft having airfoils fabricated in accordance with the disclosed embodiments.

Referring first to FIG. 1, an aircraft 100 includes a fuselage 102 having one or more airfoils, which in the illustrated example comprise wings 104, horizontal stabilizers 106 and vertical stabilizer 108. FIG. 2 illustrates a typical airfoil box 110 which may form a portion of, for example and without limitation, each of the wings 104 of the aircraft 100 shown in FIG. 1. The airfoil box 110 extends in the span-wise direction 105 shown in FIG. 1 (into the paper in FIG. 2) of a wing 104, and broadly includes one or more spars 112 sandwiched between a pair of outer skins 114. The spars 112 as well as the outer skins 114 may each comprise a fiber reinforced laminated composite, such as, without limitation, carbon fiber epoxy.

The spars 112 may be spaced apart in the chord-wise direction 128 a suitable distance to meet design requirements. Each of the spars 112 includes a spar web 116 lying in a plane extending traverse to the wing skins 114. Each of the spars 112 further includes a pair of spar chords 118 on opposite ends of the spar web 116. Each of the spar chords 118 is generally L-shaped in cross section and includes flanges 120, 122. As will be discussed below in more detail, each of the flanges 122 is bonded to the spar web 116 and each of the flanges 120 is bonded to the IML (inner mold line) 115 of one of the skins 114. Each of the spar webs 116 includes an indexing hole 126 in a medial area thereof for purposes of which will be discussed below. A radius filler 124 formed of composite material or a suitable adhesive fills a space between the end of a spar web 116, the spar chords 118 and the skin 114 in order to strengthen the bond between the spars 112 and the skins 114. FIG. 2 and subsequently discussed Figures illustrate the airfoil box 110 as being substantially flat, however the airfoil box 110, including the spar webs 116 and/or the skins 114 will typically be contoured in one or more directions, including being curved along the span-wise direction 105 (FIG. 1) and along the cord wise chord-wise direction 128 shown in FIG. 2.

Attention is now directed to FIG. 3 which broadly illustrates apparatus 135 for fabricating composite airfoils such as the airfoil box 110 shown in FIG. 2. The apparatus 135 broadly comprises one or more internal tools 138 and a cure fixture 140. A spar 112 comprising a spar web 116 and "green" spar chords 118 is clamped to an internal tool 138. Skins 114 are then temporarily secured to the internal tool 138, in indexed relationship to the spar 112 along the span-wise direction 105 (FIG. 1) of the airfoil box 110. The assembly of the spar 112 and skins 114 is loaded onto a cure fixture 140 and the entire assembled structure may be placed in an autoclave for final curing. As will be discussed below in more detail, the spar web 116 as well as skins 114 are pre-cured, and the spar chords 118 are cured when the entire assembled structure is placed in the autoclave for final curing. Alternatively, depending on the material systems being used in a particular application, final curing may be carried out in an oven at or near atmospheric pressure (e.g. 15 psi).

FIG. 4 broadly illustrates the steps of a method of fabricating a composite airfoil, such as the airfoil box 110 shown in FIG. 2. Beginning at 130, the composite skins 114 are made and pre-cured. Similarly, at 131 one or more composite spar webs are made and pre-cured. The skins 114 and the spar webs 116 may be fabricated using conventional fabrication composite laminate fabrication techniques, including automated or hand layup of plies. Next, at 132, at least one spar 112 is made by attaching uncured spar chords 118 and fillers 124 to a pre-cured spar web 116. At step 134, the pre-cured skins 114 and a spar 112 are assembled. The spar chords 118 are compacted against the skins 114. Finally, at step 136, the spar chords 118 are cured, thereby co-bonding them to both the pre-cured spar web 116 and the pre-cure skins 114.

Figure 5:
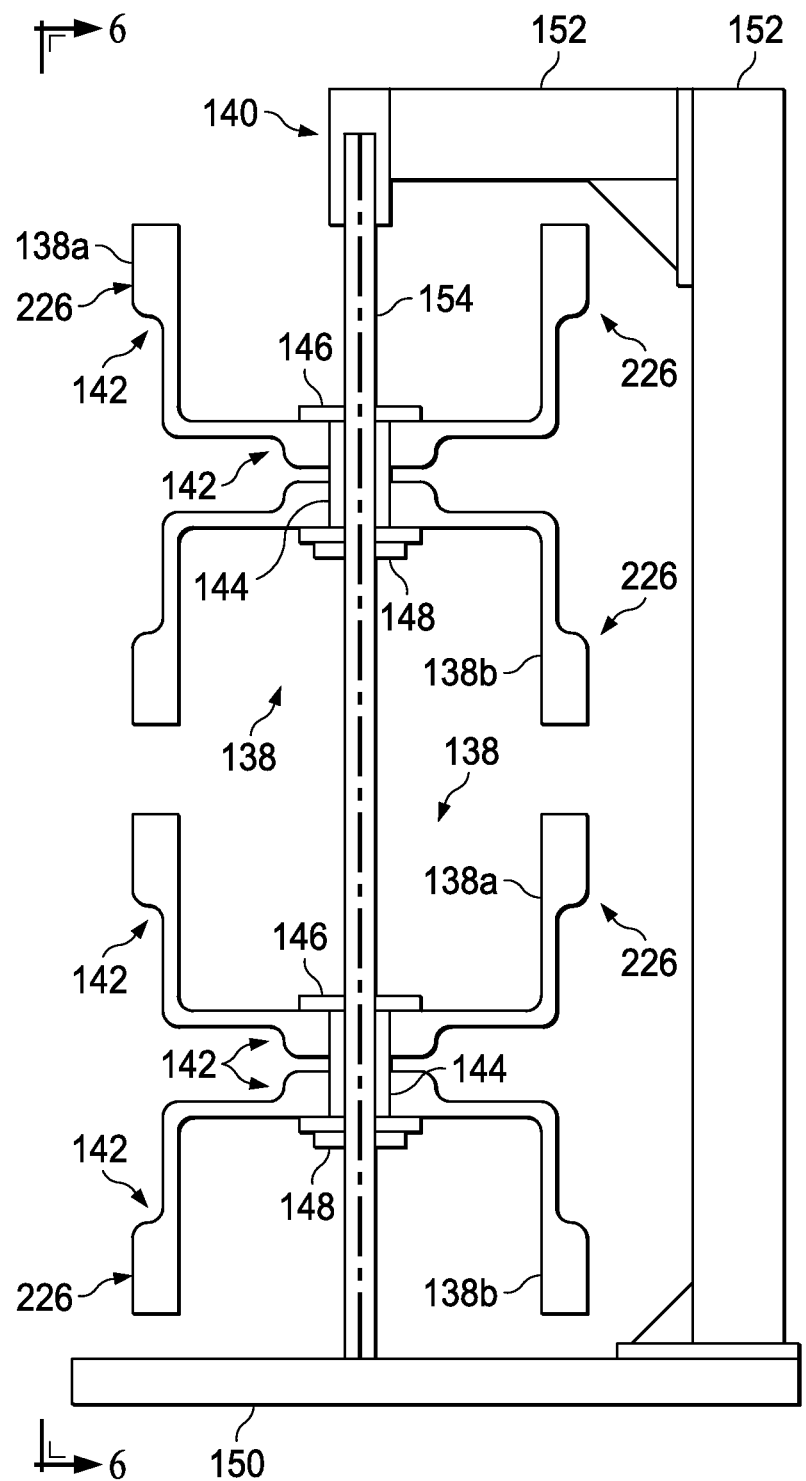
FIG. 5 is an illustration of an end view of the cure fixture and a pair of internal tools, the skins and spars not shown for clarity.
Figure 6:
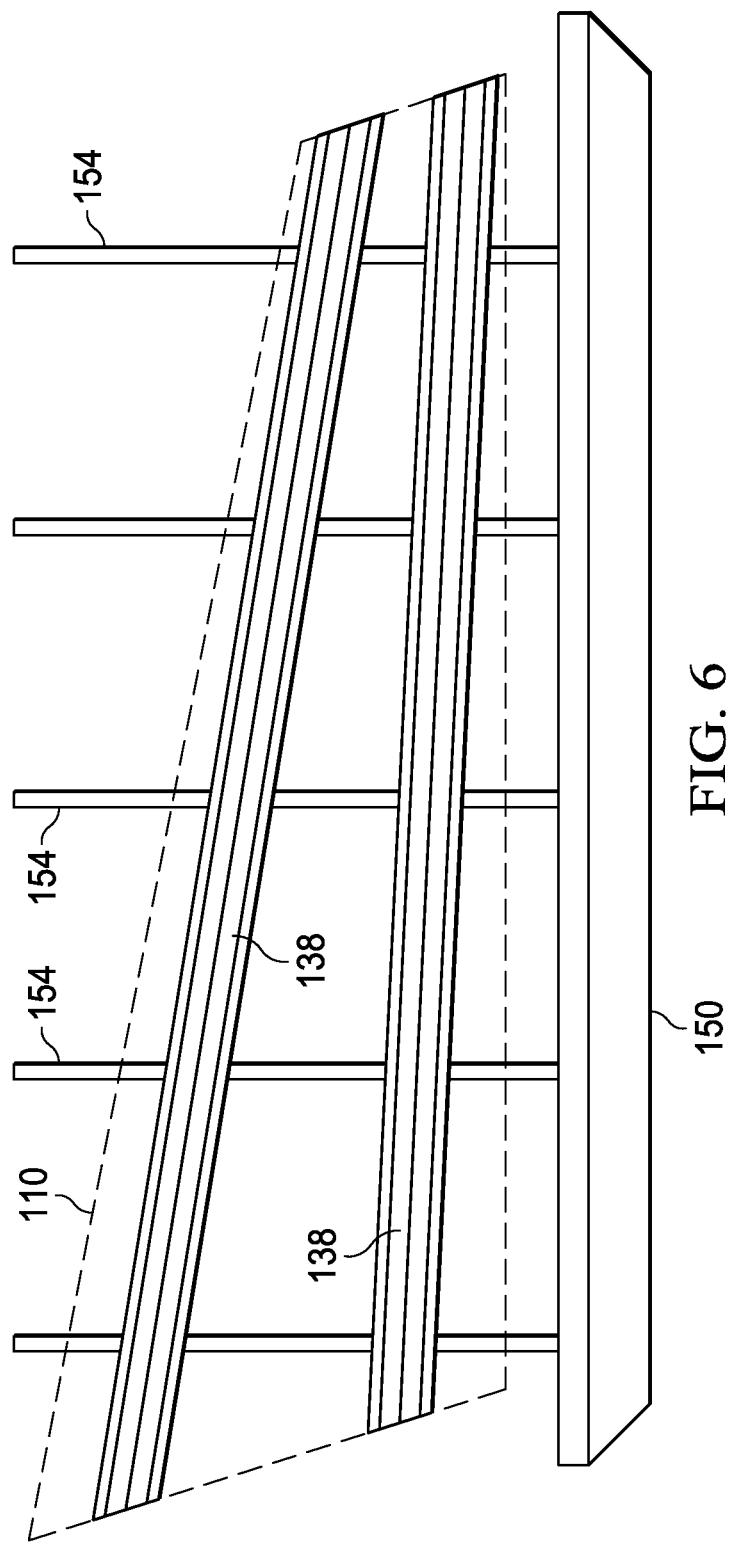
FIG. 6 is an illustration of a side view taken in the direction shown as "6" in FIG. 5.

Attention is now directed to FIGS. 5 and 6 which illustrate additional details of the internal tools 138 and the cure fixture 140. In this example, a pair of internal tools 138 are shown, however, in other embodiments, more or less than one internal tool 138 may be employed, depending of the number of spars 112 used in the airfoil box 110 (FIG. 2). Each of the internal tools 138 comprises first and second halves or portions 138a, and 138b, which for convenience, will be referred to hereinafter as an upper tool portion 138a and a lower tool portion 138b. The upper and lower tool portions 138a, 138b are coupled together by a removable clamping sleeve 144 which includes a clamping sleeve collar 146.

The cure fixture 140 includes a plurality of spaced apart indexing rods 154 supported on a base 150. The indexing rods 154 support and index the internal tools 138 along the full length of the cure fixture 140 at multiple locations. The internal tools 138 extend along the full span of the airfoil box 110. As will be discussed below, internal tools 138 may not be subjected to autoclave forces during the final cure process. The internal tools 138 have outer surfaces 226 that are curved, as required to substantially match the curvature of the skins 114. The cure fixture 140 may further include bracing 152 to support the indexing rods 154 and internal tools 138, as required. It should be noted here that in the illustrated example, the internal tools 138 and the cure fixture tool 140 do not require any structure defining the OML (outer mold line) of the wing box 110, since that OML is defined by the pre-cured skins 114.

As will become apparent later, the indexing rods 154, base 150 and bracing 152 essentially provide a relatively simple holding fixture for holding the internal tools 138 in an indexed position along the span-wise direction 105 (FIG. 1) of the wing box 110 during final curing. Each of the upper and lower tool portions 138a, 138b includes a generally L-shaped recess 142 for purposes that will become later apparent. Indexing stops 148 secured to the indexing rods 154 determine the vertical position of each of the internal tools 138 on the cure fixture 140.

Referring now to FIG. 7A, each of the spar chords 118 shown in FIG. 2 may be fabricated by assembling a flat, multi-ply composite layup 159, using for example, numerically controlled automated processes, such as an automatic fiber placement machine. Other layup techniques are possible. Referring to FIG. 7B, the flat layup 158 may be hot-draped formed down over a suitable forming block 160, to form the flat layup 158 to the desired shape of the spar chord 118e. Other forming techniques may be possible. Next, as shown in FIG. 7C, a layer of adhesive 161 may be applied over the formed spar chord 118, following which, as shown in FIG. 7D, spar chord 118 may be removed from the forming block 160 and trimmed as desired in its green or uncured state. Alternatively, the layer of adhesive 161 may be applied to the spar web 116 when the components of the spar 112 are assembled, as discussed below in connection with FIG. 9.

FIGS. 8A-8C illustrate a method for forming the fillers 124. As shown in FIG. 8A, a length of a filler 124 material which may comprise an adhesive or a laminate is placed in the die cavity 166 of a die block 164. Then, as shown in FIG. 8B, a suitable tool 168 is used to press the filler 124 material into the die cavity 166, thereby forming the filler 124 material to the desired cross sectional shape. Referring to FIG. 8C, the preformed filler 124 may be removed from the die block 164 and trimmed as desired in its green or uncured state.

FIGS. 9-12 sequentially illustrate one suitable technique for pre-assembling the components of the spar 112 using a compaction tool assembly 165, and pre-compacting the spar chords 118 against the spar web 116. The compaction tool assembly 165 comprises top and bottom forming blocks 170, 172, and lateral forming blocks 176, 178. The compaction tool assembly 165 further includes a plurality of spaced apart central alignment pins 180 secured on the lower block 172 that are aligned with and received within corresponding holes 174 in the upper block 170. The spacing and cross sectional size and shape of the alignment pins 180 substantially correspond to that of the indexing rods 154 shown in FIGS. 5 and 6.

The spar web 116 may comprise a cured flat composite laminate having a plurality of spaced apart central apertures 126 therein which respectively receive the alignment pins 180 to align the cured spar web 116 in the compaction tool assembly 165. The cured spar web 116, uncured fillers 124 and uncured spar chords 118 are assembled as shown in FIG. 9, following which, as shown in FIG. 10, the forming blocks 170, 172, 176, 178 are used to pre-compact the components of the spar 112. Forming blocks 170, 172, 176 may be compacted using conventional vacuum bags (not shown) or press devices (not shown). The adhesive 161 (FIGS. 7C, 7D) assist in holding the uncured spar chords 118 on the cured spar web 116 as the spar chords 118 are being compressed against the spar web 116 and the fillers 124. Following compaction, the upper forming block 170 is lifted as shown in FIG. 11, allowing the assembled spar 112 to be removed from the lower forming block 172 and alignment pins 180, as shown in FIG. 12. As will be discussed later in more detail, the spar chords 118 are adhered to the spar web 116 at locations such that the spar chords 118 are slightly setback from the IML (inner mold line) 115 (FIG. 2) of the skins 114 to assure that there is no fit interference when they are assembled together.

Figure 14:
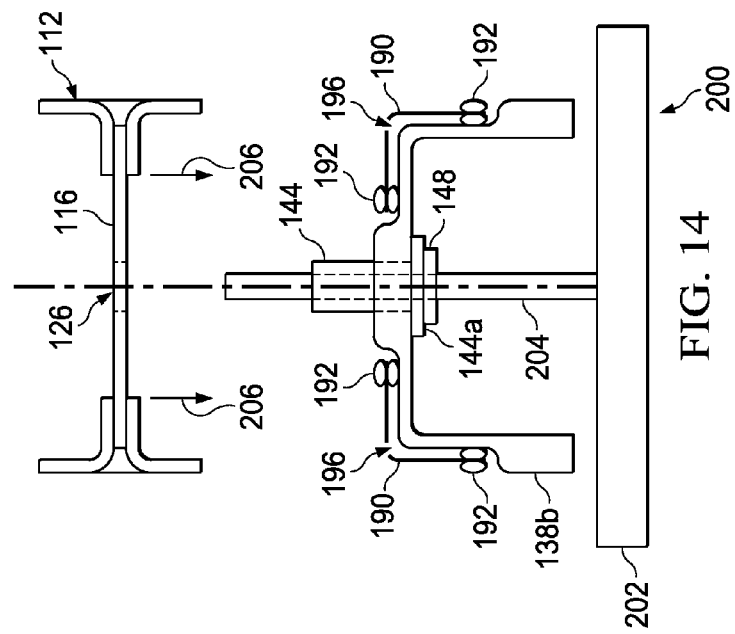
FIG. 14 is an illustration similar to FIG. 13, but showing the lower tool portion fully loaded and depicting an assembled spar in the process of being loaded onto the lower tool portion.
Figure 13:
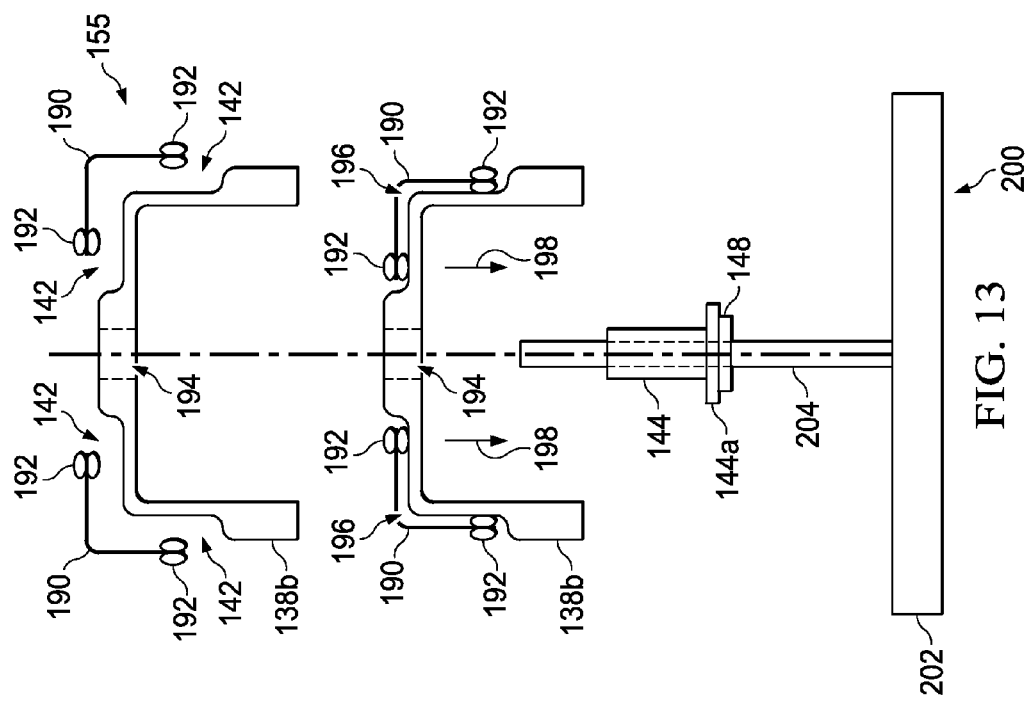
FIG. 13 is an illustration of an end view of a spar pre-assembly fixture during loading of a lower portion of an internal tool.

FIG. 13 illustrates a preassembly fixture 200 that is used to preassemble each of the spars 112 with the internal tooling 138 (FIG. 5). Preassembly fixture 200 comprises a plurality of rods 204 mounted on a base 202 at spaced apart, indexed locations corresponding to the locations of the indexing rods 154 shown in FIG. 5. Each of the rods 204 includes a stop 148. Each of the clamping sleeves 144 is sleeved over a corresponding one of the rods 204 and is vertically located by one of the stops 148. As shown at 155, strips of vacuum bags 190 respectively extending the length of the internal tool 138 are sealed to the lower tool portion 138b by double seals 192, covering the recesses 142. After the vacuum bags 190 are installed on the lower internal tool portion 138b, the tool portion 138b is loaded 198 onto the preassembly fixture 200, with the rods 204 passing through central internal apertures 194 in the internal tool portion 138b. A vacuum is drawn in the vacuum bags 190, causing the latter to be drawn down against the recessed portion 196 of the lower tool portion 138b. Drawing the vacuum bags 190 down against the tool portion 138a in this manner assures that the vacuum bags 190 do not interfere with subsequently assembled components until readied for final curing. Next, as shown in FIG. 14, the assembled spar 112 is loaded onto the lower tool portion 138b and indexed by the rods 204 along the full length of the spar 112.

Figure 15:
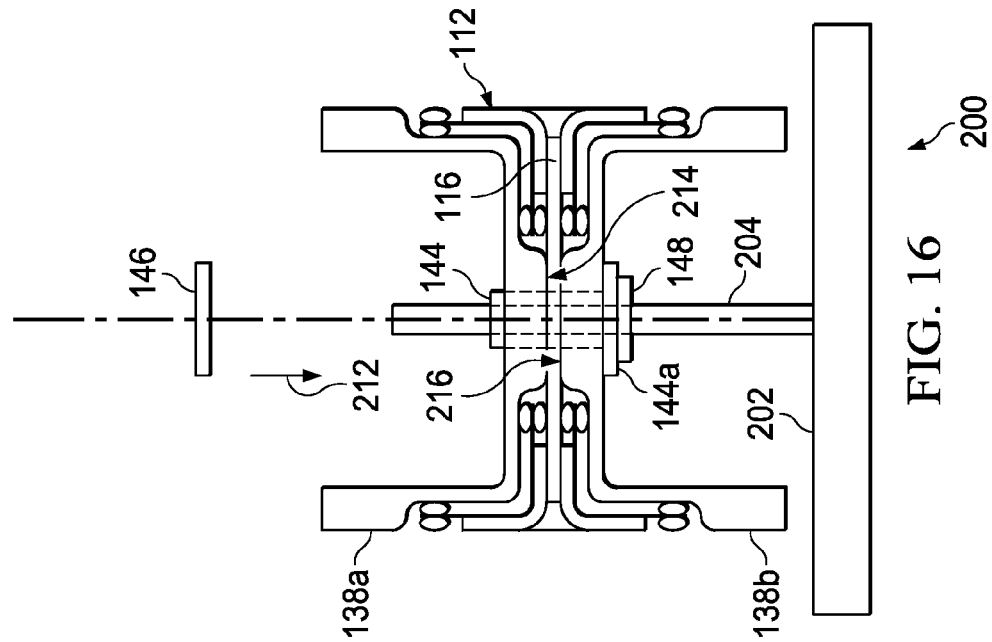
FIG. 15 is an illustration similar to FIG. 14, but showing the upper portion of the internal tool in the process of being loaded onto the pre-assembly fixture.
Figure 16:
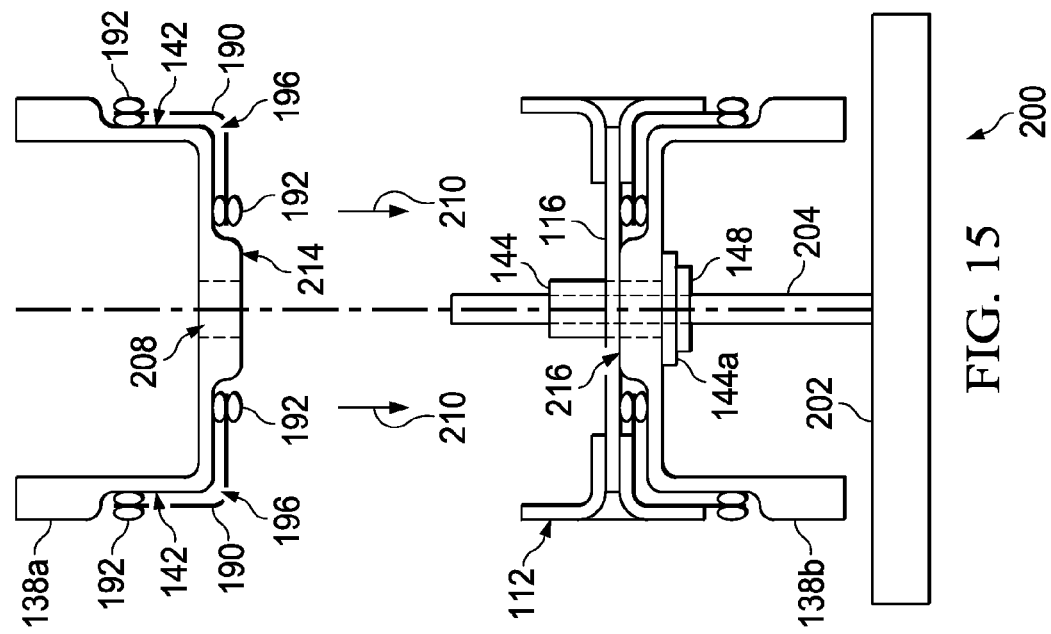
FIG. 16 is an illustration similar to FIG. 15 but showing the upper tool portion having been loaded and depicting installation of a clamping sleeve collar.
Figure 17:
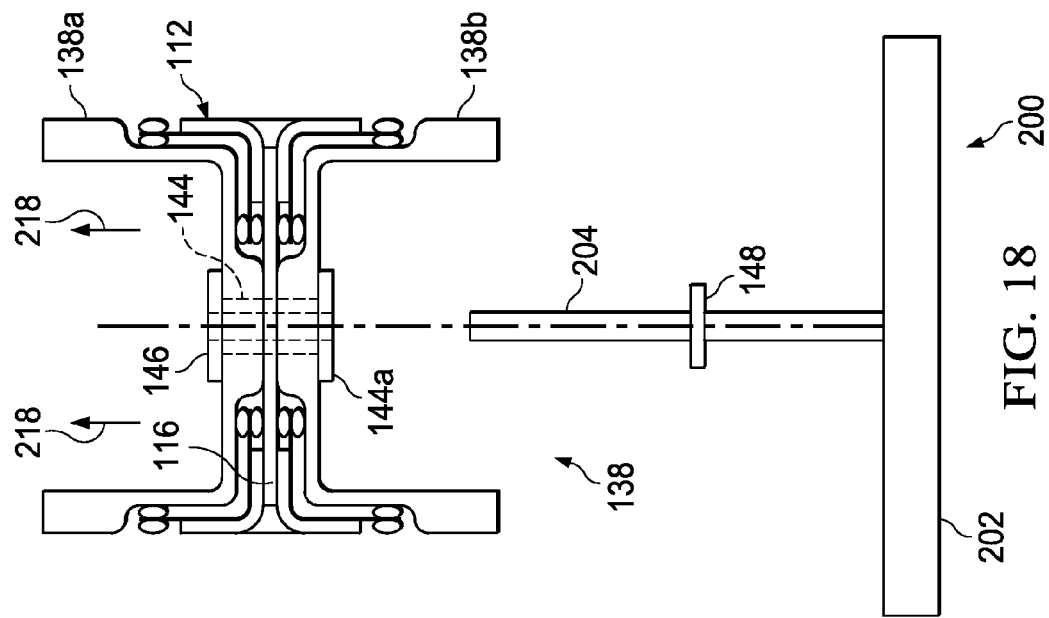
FIG. 17 is an illustration similar to FIG. 16 but showing the clamping sleeve collar fully installed, and the spar clamped within the internal tool.
Figure 18:
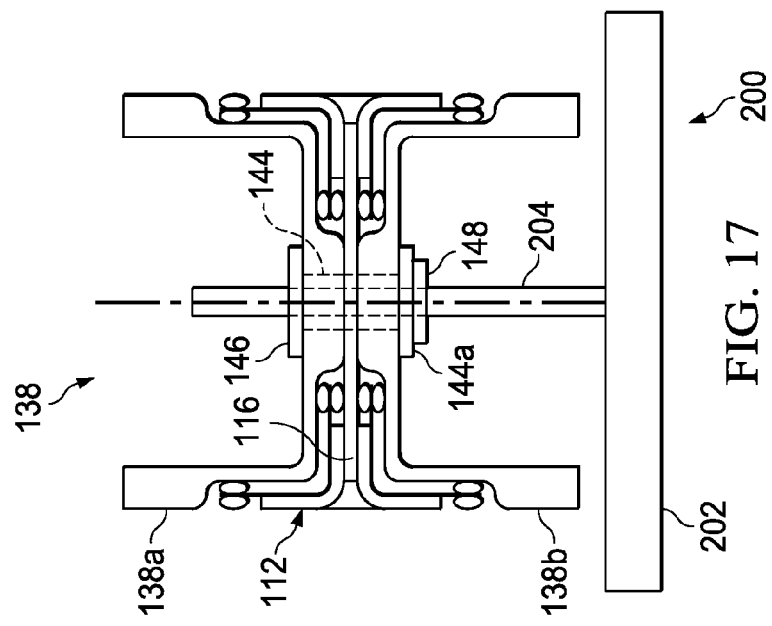
FIG. 18 is an illustration similar to FIG. 17 but showing the assembly of the internal tool and clamped spar being lifted away from the pre-assembly fixture.

Referring now to FIG. 15, strips of vacuum bags 190 are installed on the upper internal tool portion 138a and sealed to the latter by double seals 192. The upper internal tool portion 138a is then loaded 210 onto the preassembly fixture 200, resulting in the spar web 116 being trapped between the opposing faces 214, 216 of the internal tool portions 138a, 138b respectively, as best seen in FIG. 16. A clamping sleeve collar 146 is installed 212 on the clamping sleeve 144, locking the internal tool portions 138a, 138b together with the spar 112 clamped therebetween as shown in FIG. 17. Following this clamping procedure, as shown in FIG. 18, the entire internal tool 138 along with the clamped spar 112 may be removed from the preassembly fixture 200. It should be noted here that the need for vacuum bagging either the skins 114 or the spar webs 118 is avoided in accordance with the disclosed embodiments, since they are precured. Accordingly, total area of vacuum bagging (restricted to the area of the spar chords 118) is substantially minimized.

Figure 19:
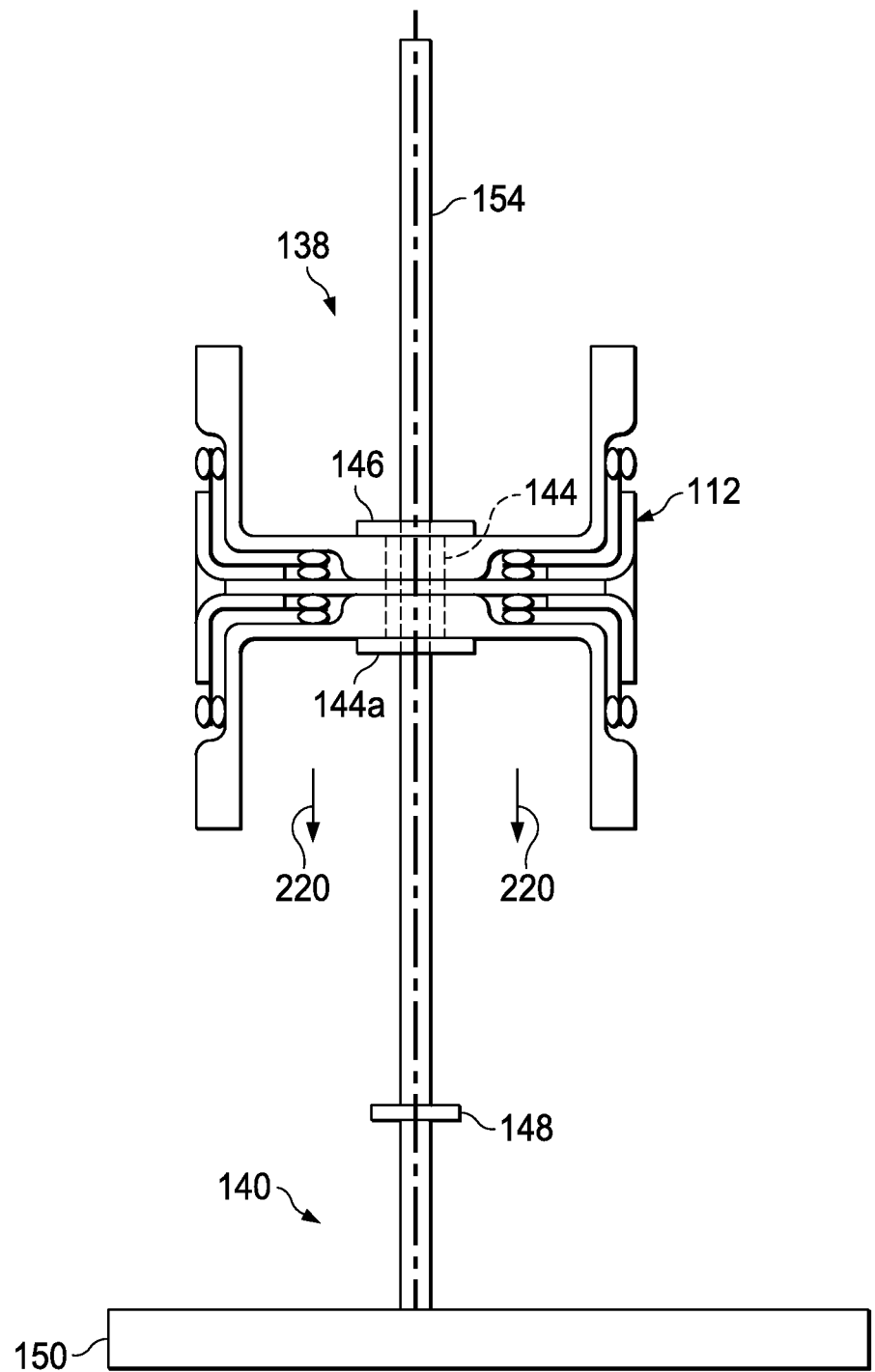
FIG. 19 is an illustration of an end view showing the internal tool and a clamped spar being loaded onto the cure fixture.
Figure 20:
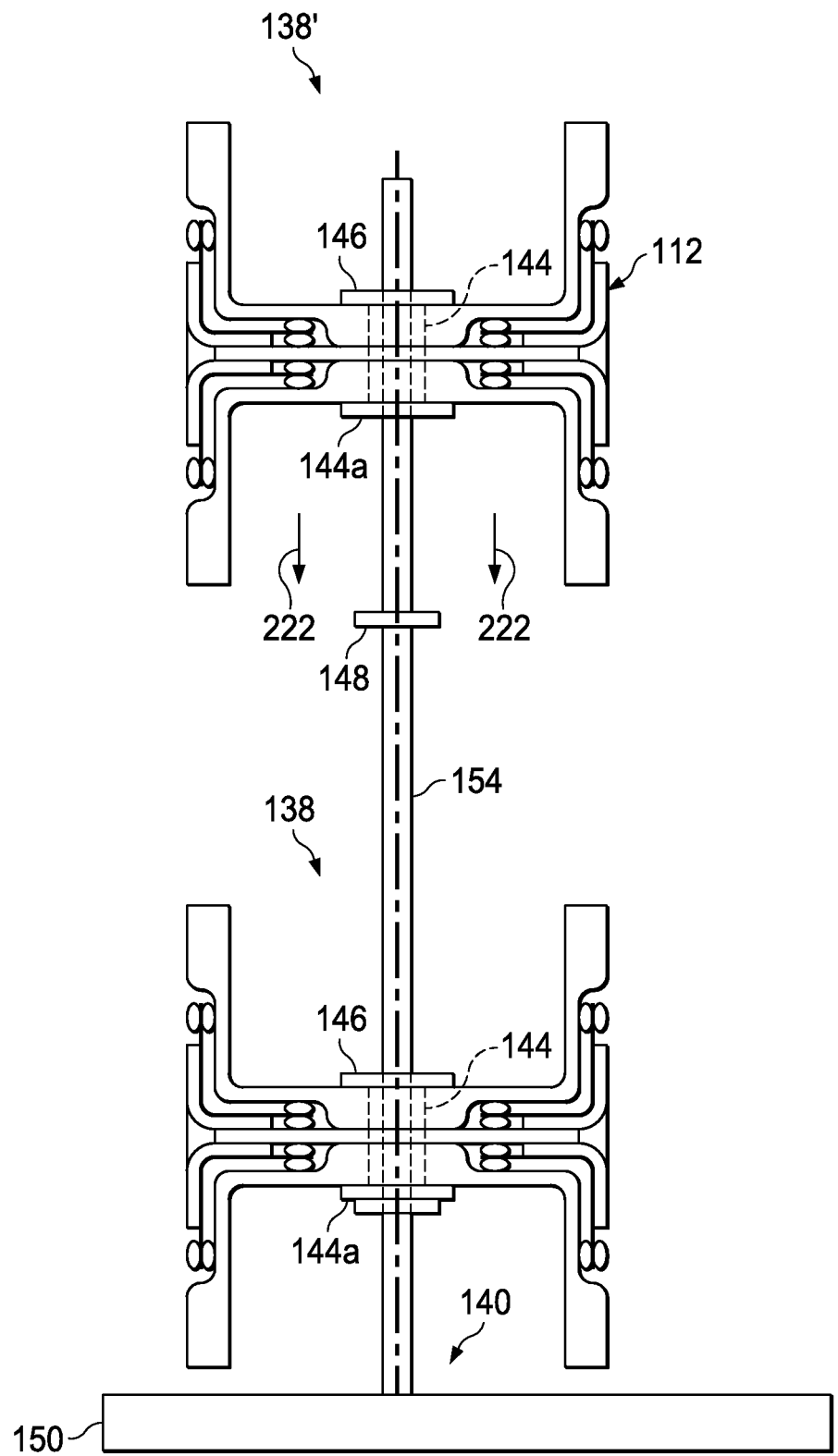
FIG. 20 is an illustration similar to FIG. 19 but showing a second internal tool and clamped spar in the process of being loaded onto the cure fixture.
Figure 21:
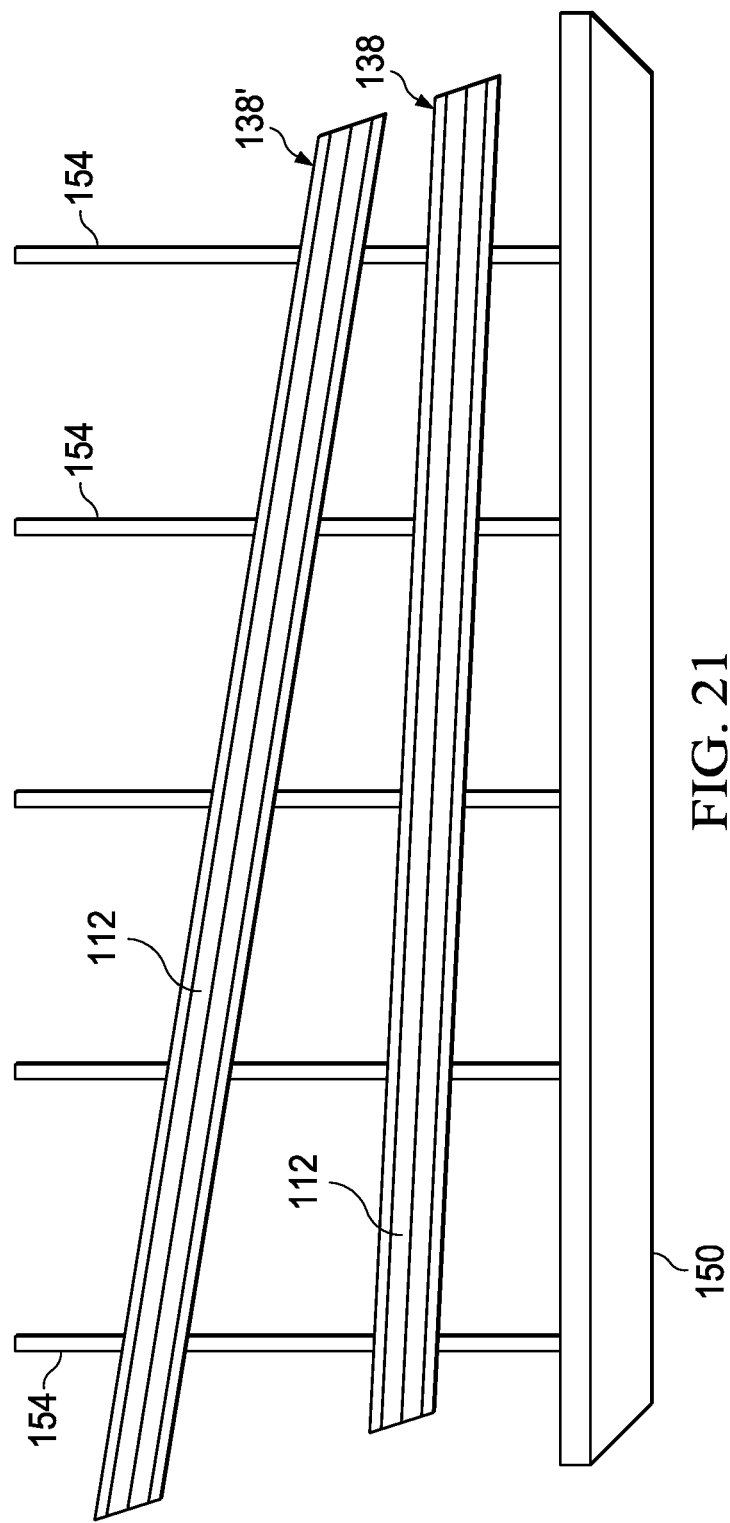
FIG. 21 is an illustration of a side view similar to FIG. 6, but showing two spars respectively held in the internal tools shown in FIG. 20 and indexed along the length of the cure fixture.

Referring now to FIG. 19, the internal tool 138 along with the clamped spar 112 is then transferred to the cure fixture 140 and sleeved down 220 over the indexing rods 154 until the lower collars 144a of the clamping sleeves 144 engage stops 148. As shown in FIGS. 20 and 21, a second internal tool 138' along with another clamped spar 112 may be loaded onto the cure fixture 140, and positioned against a second set of stops 148 on the indexing rods 154. FIG. 21 illustrates the positions of the internal tools 138, 138' and the spars 112 following this assembly process. As previously discussed in connection with FIGS. 5 and 6, the multiple indexing rods 154 support the internal tools 138, and are aligned such that they index the internal tools 138 along the full length of the cure fixture 140 at multiple locations.

Figure 22:
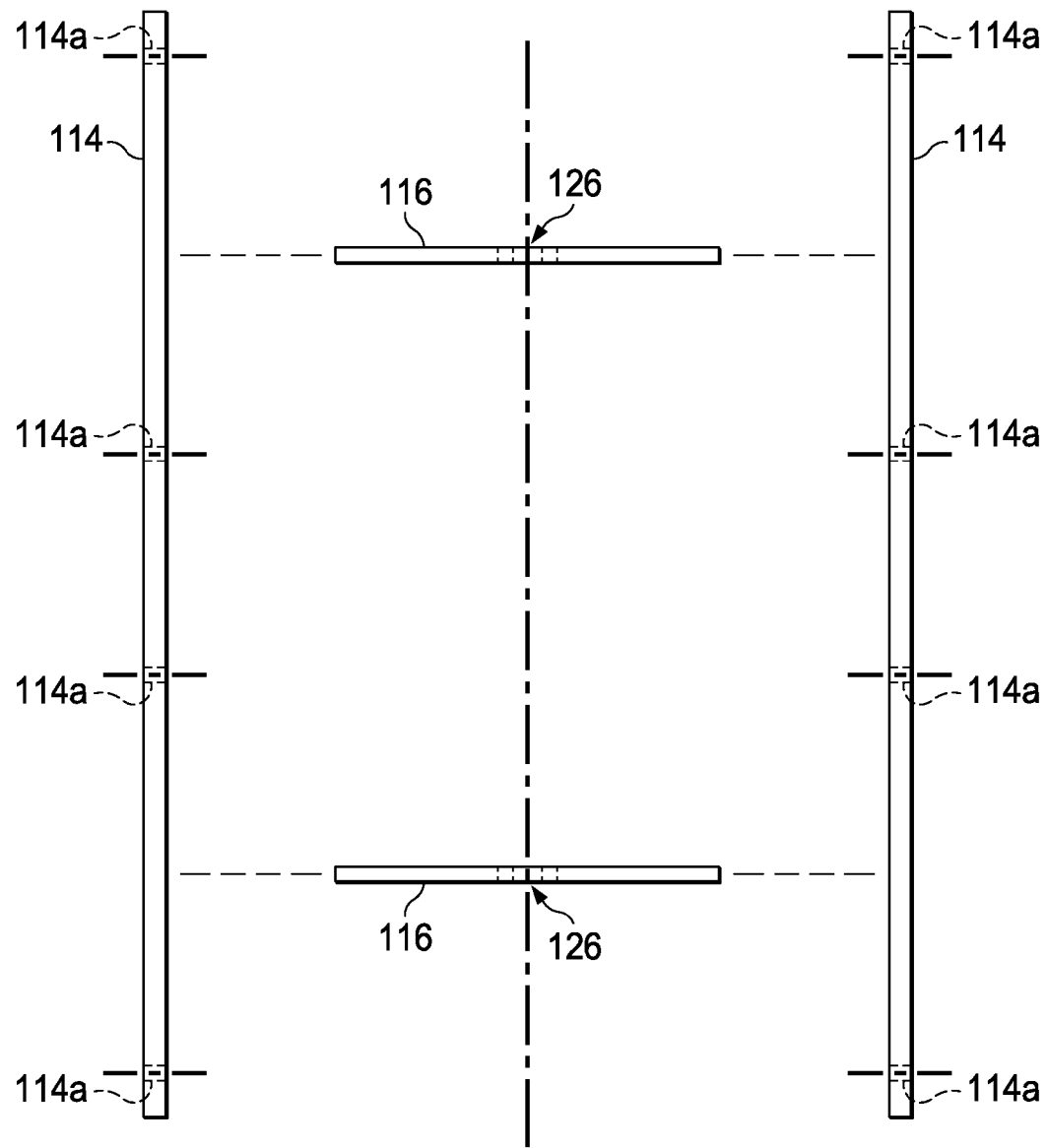
FIG. 22 is an illustration of a cross sectional view showing the placement of indexing holes in the skins and two of the spar webs.
Figure 23:
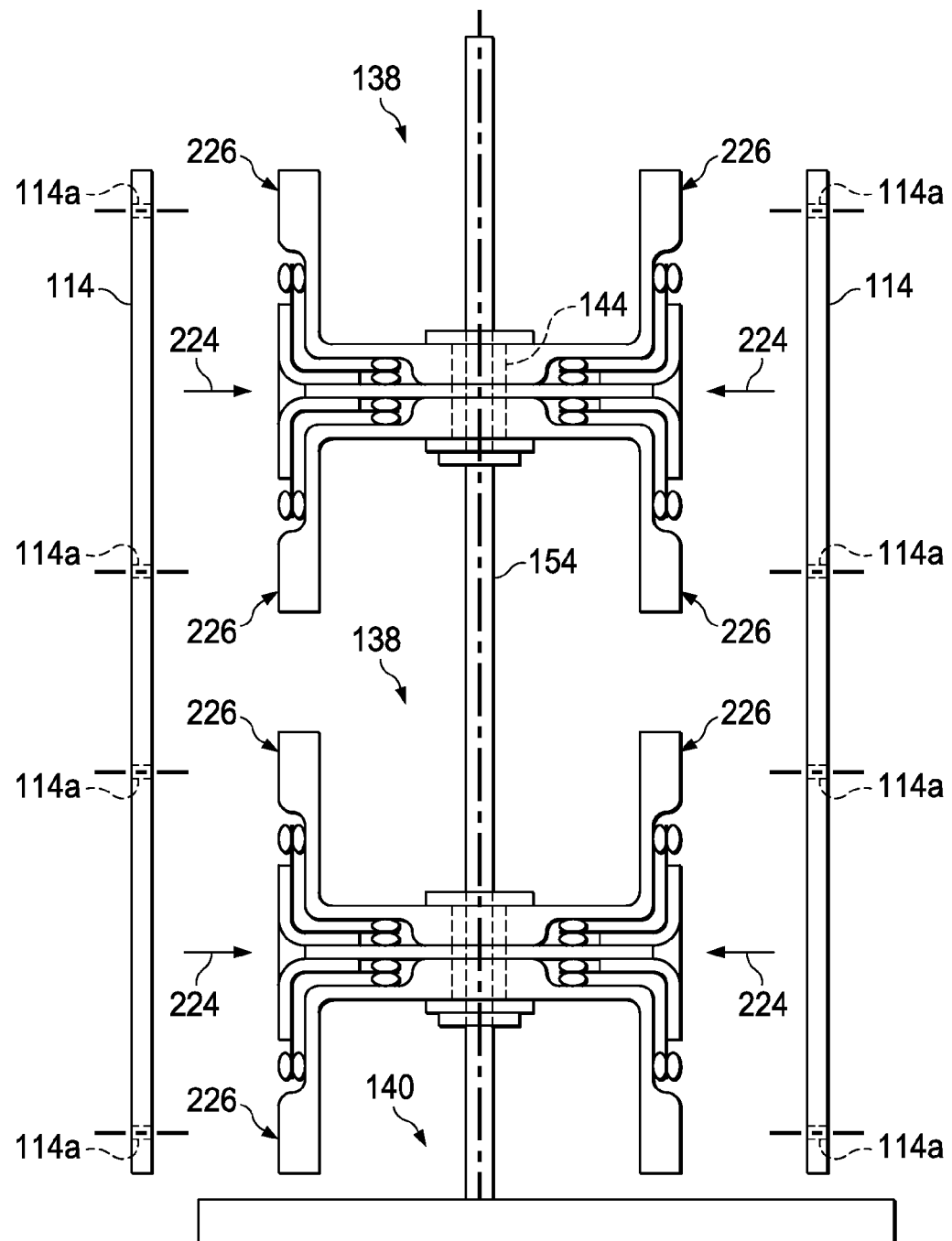
FIG. 23 is an illustration of an end view of the cure fixture showing the skins in the process of being mounted on the internal tools.
Figure 24:
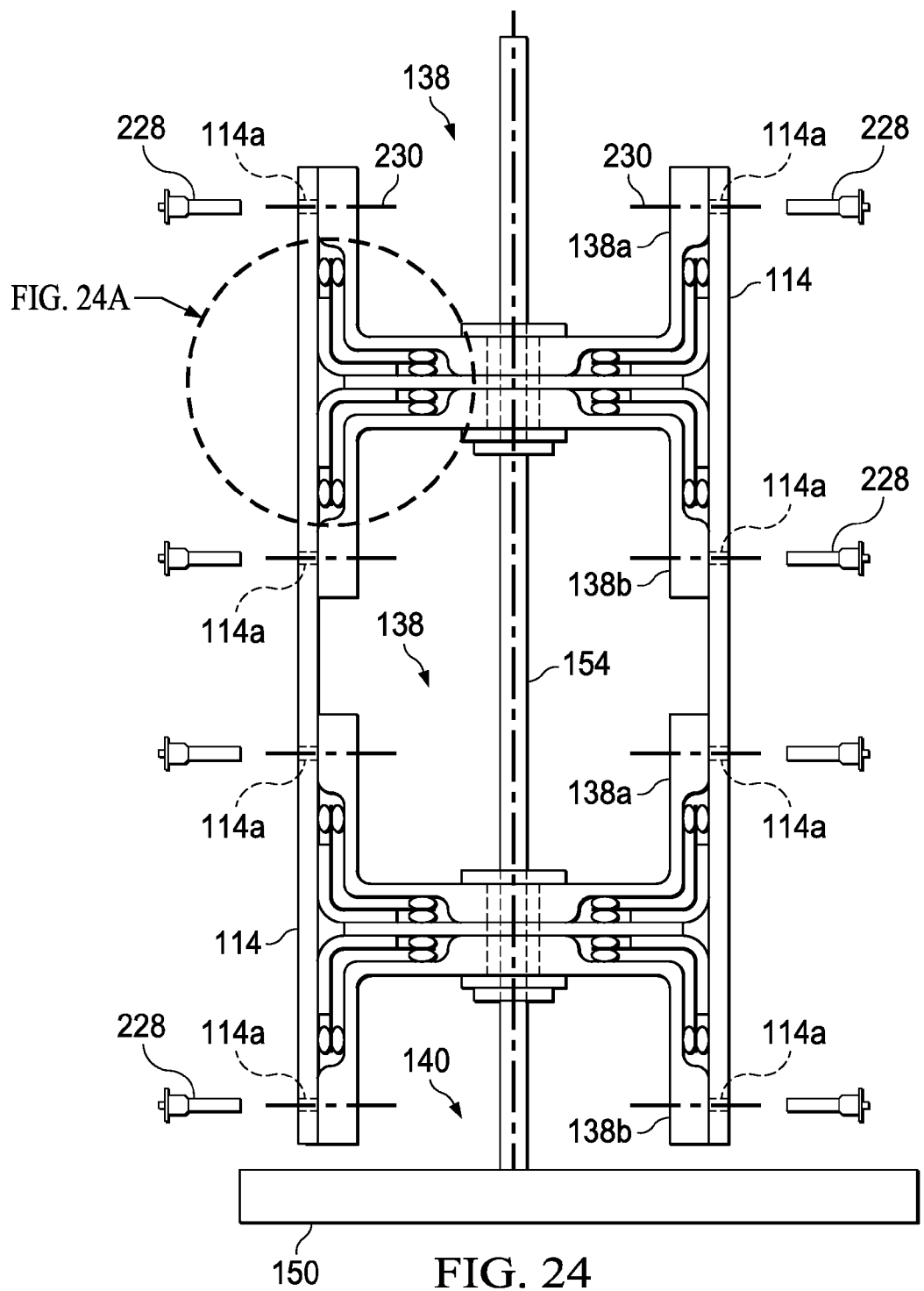
FIG. 24 is an illustration similar to FIG. 23 but showing the skins placed against the internal tools and fastener pins being readied for installation.
Figure 24A:
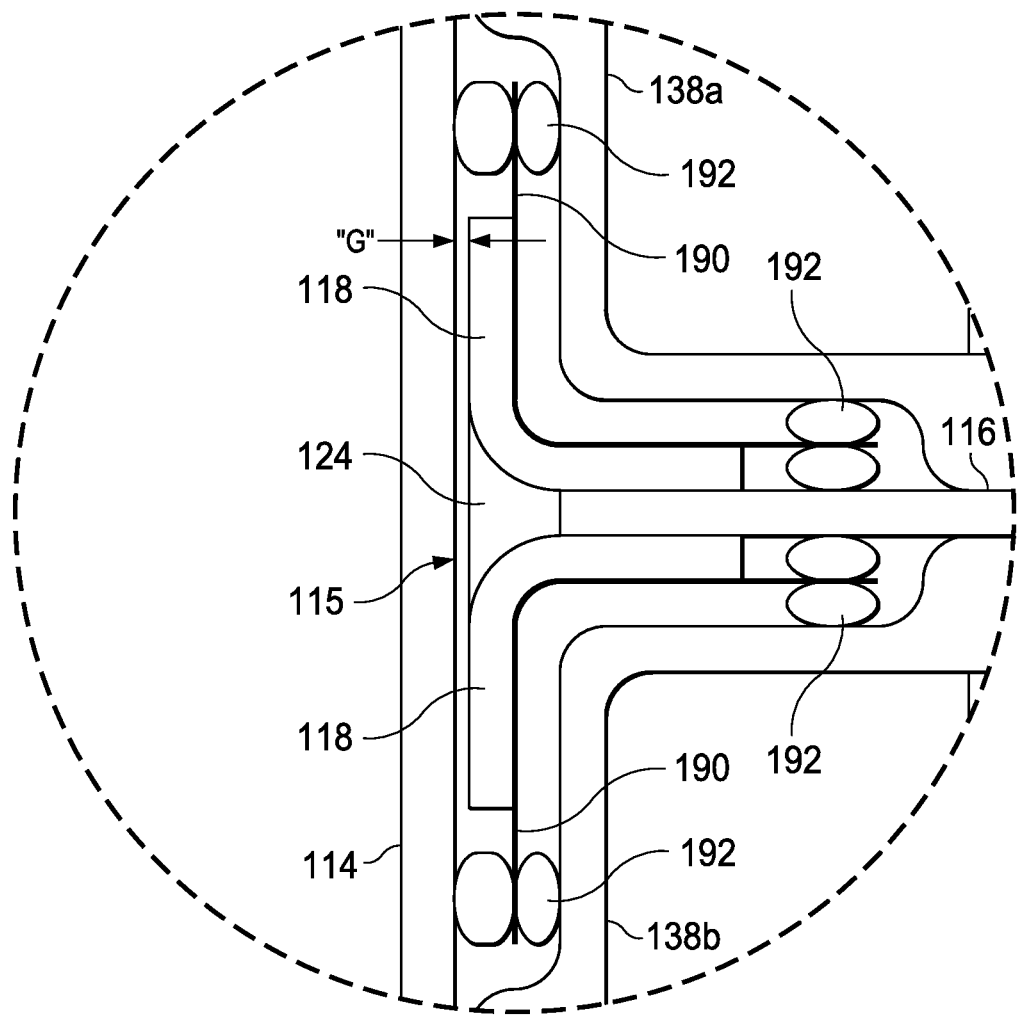
FIG. 24A is an illustration of the area designated as FIG. 24A in FIG. 23, and illustrating a gap between the spar chords and the skin.

Referring now to FIG. 22, as previously mentioned, each of the spar webs 116 has a plurality of central apertures 126 that index the spar web 116 along the span of the airfoil box 110. Indexing holes 114a are then formed by any suitable process, such as by drilling in the skins 114. As shown in FIG. 23, the indexing holes 114 and the skins 114 are aligned with the exterior surfaces 226 of each of the internal tools 138. The skins 114 are mounted 224 against the external faces 226 of the tools 138, following which, as shown in FIG. 24, fastener pins 228 are inserted through indexing holes 114a in order to releasably attach the skins 114a to the internal tools 138. The pins 228 may comprise, for example and without limitation, ball-type locking pins. Referring to FIG. 24A, as previously mentioned, spar chords 118 may be slightly spaced from the IML 115 of the skins 114 to form a slight gap "G". The gap "G" helps assure that the skins 114 seat flushly against the external faces 226 of the tools 138, without interference that could be caused by possible contact with the spar chords 118.

Figure 25:
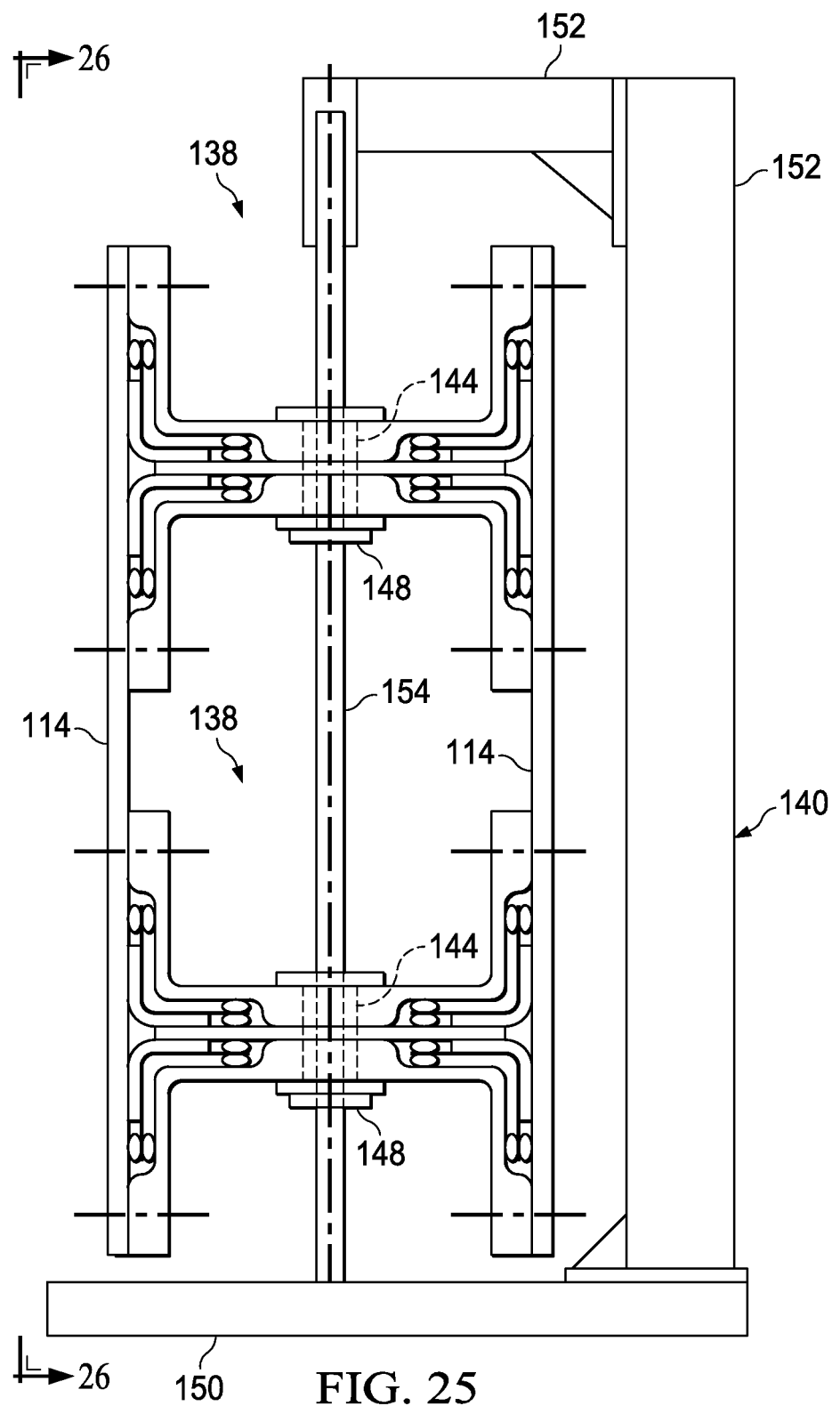
FIG. 25 is an illustration similar to FIG. 24 but showing bracing having been installed on the cure fixture.
Figure 26:
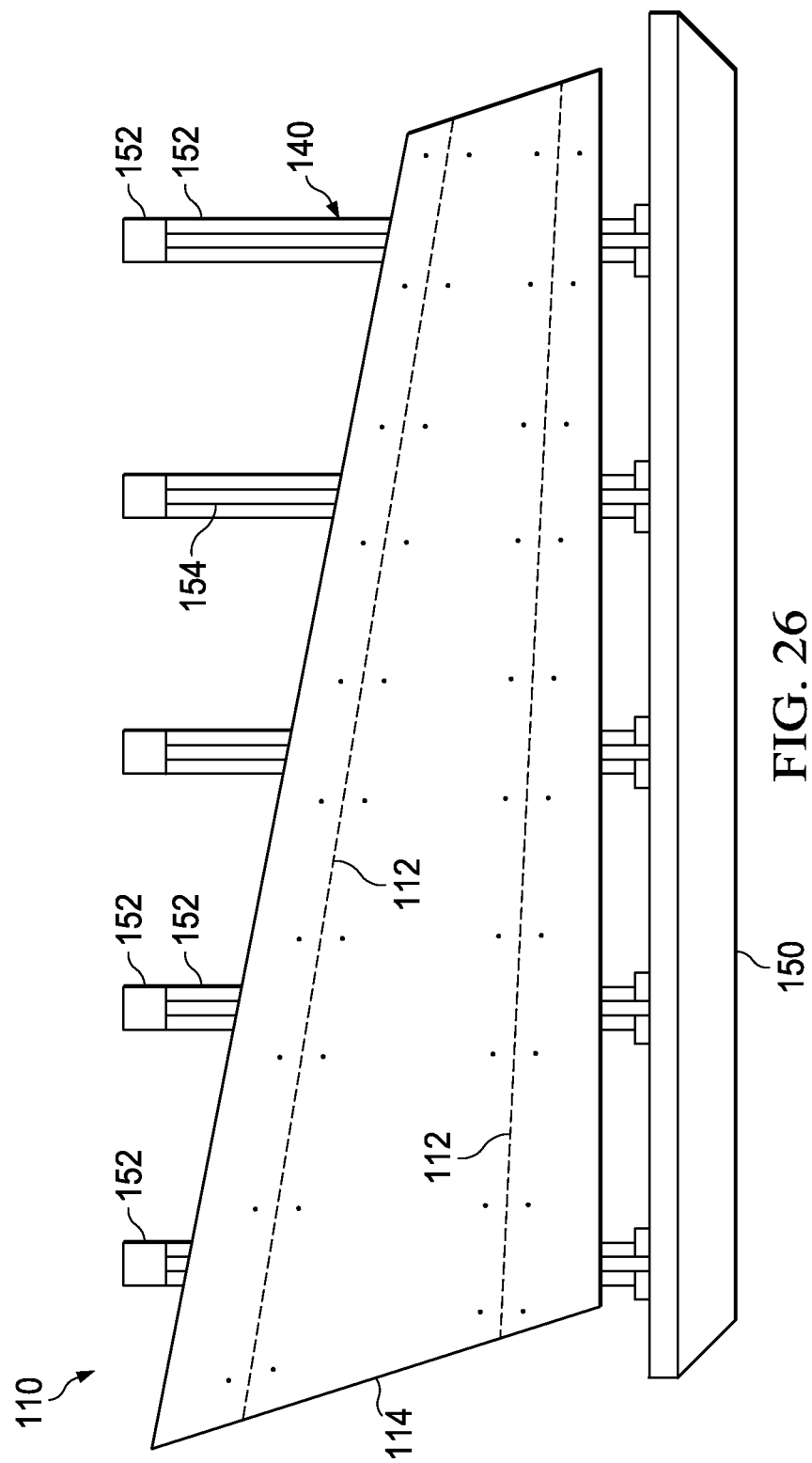
FIG. 26 is an illustration of a side view taken in the direction shown as "26" in FIG. 25.

Referring now to FIGS. 25 and 26, after the skins 114 are attached to the internal tools 138, bracing 152 may be installed on the cure fixture 140 in order to stabilize the internal tools 138 along the entire length of the tool fixture 140, in preparation for final cure operations.

Referring again to FIG. 24A, in preparation for the final cure process, the vacuum previously drawn on the vacuum bags 190 is reversed, causing the bags 190 to compact the spar chords 118 against the spar webs 116 and the skins 114. Thus, it may be appreciated that the bag compaction force is reacted substantially only by the spars 112 and the skins 114. The cure fixture 140 may be placed in an autoclave (not shown) to cure the uncured spar chords 118 as they are being compacted against the spar webs 116 and the skin 114. The compaction force applied to the spar chords 118 by the vacuum bags 190, along with autoclave pressure (where required), force the flanges 120 (FIG. 2) of the spar chords 118 against the IML 115 of the skins 114, conforming and molding the spar chord 118 to any variations or undulations (not shown) in the IML 115. The combination of the cure fixture 140 and the internal tools 138 maintain the indexed positions of the spars 112 and the skins 114 throughout the final cure. Additionally, the use of the internal tools 138 in combination with the cure fixture 140 provides solid support and reinforcement of the uncured spar chords 118 throughout the assembly and curing process, with minimal need for auxiliary equipment. As a result, the possibility of damage to fragile parts such as the spar chords 118 is greatly reduced or eliminated.

Figure 27:
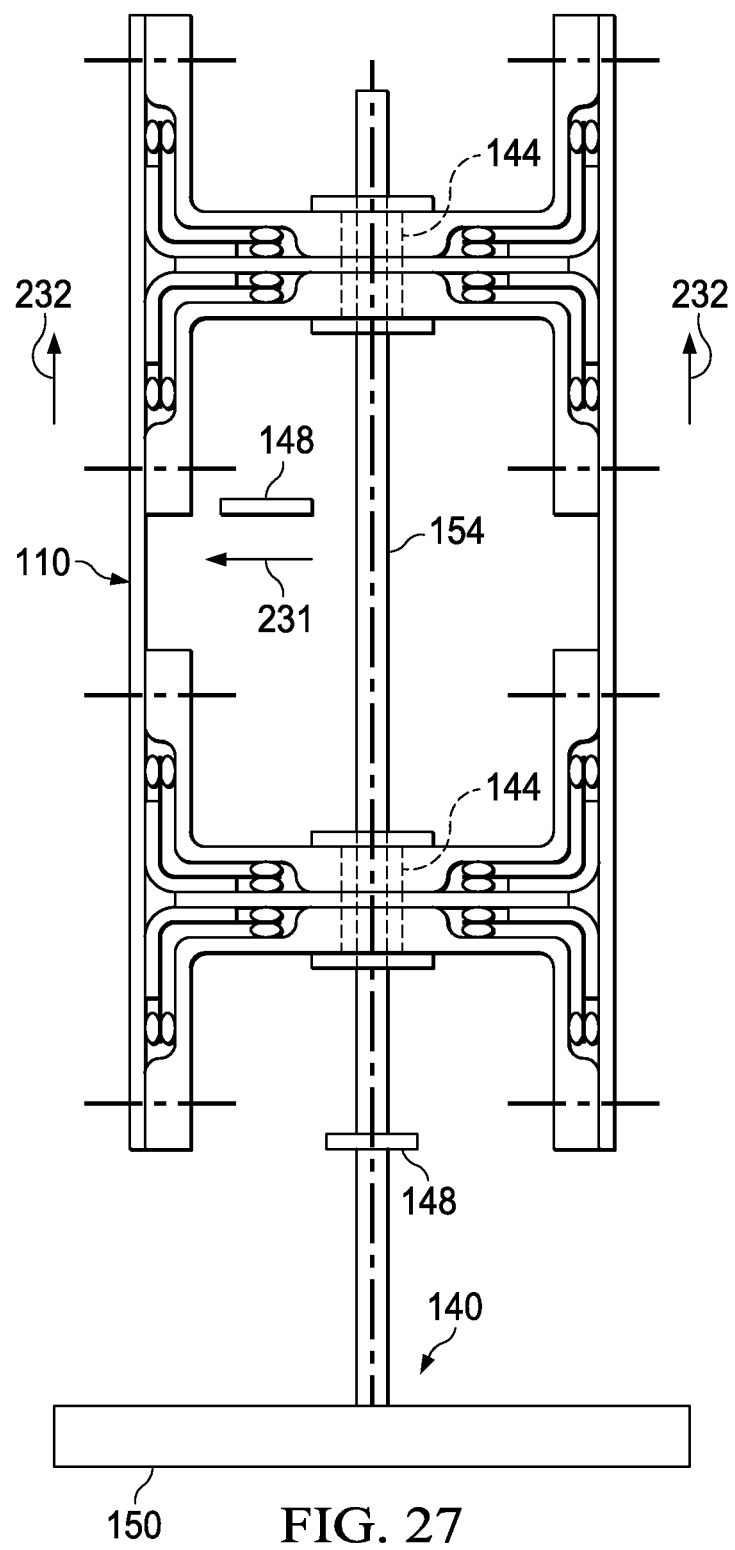
FIG. 27 is an illustration of an end view showing the airfoil box being removed from the cure fixture following final curing.
Figure 28:
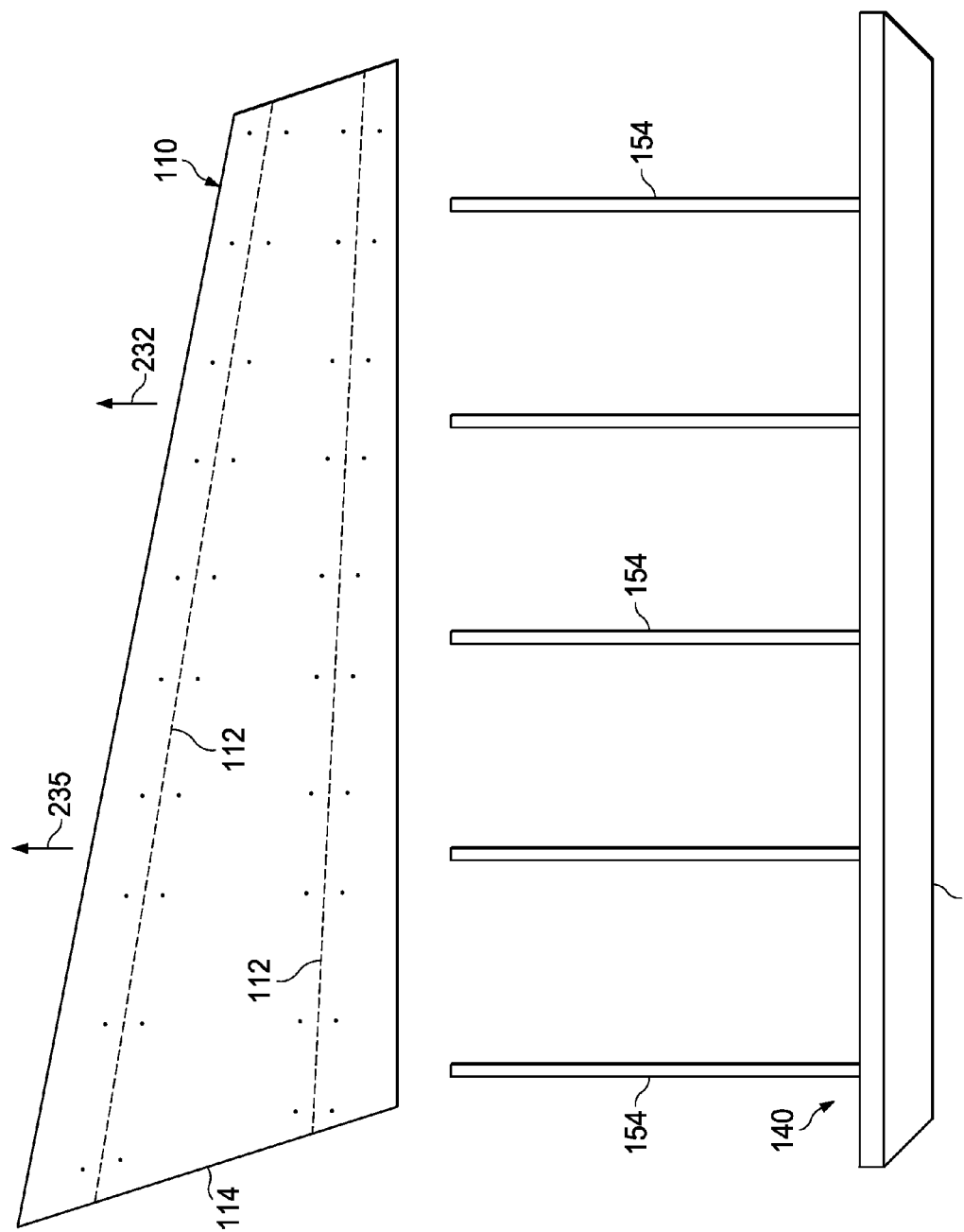
FIG. 28 is an illustration of a side view showing the airfoil box being lifted away from the cure fixture following final curing.

Referring now to FIG. 27, following the final cure, upper spar indexing stop 148 may be removed 231, allowing the airfoil box 110 along with the internal tools 138 to be slid 232 up the indexing rods 154 and lifted away 235 from the cure fixture 140 as shown in FIG. 28.

Figure 29:
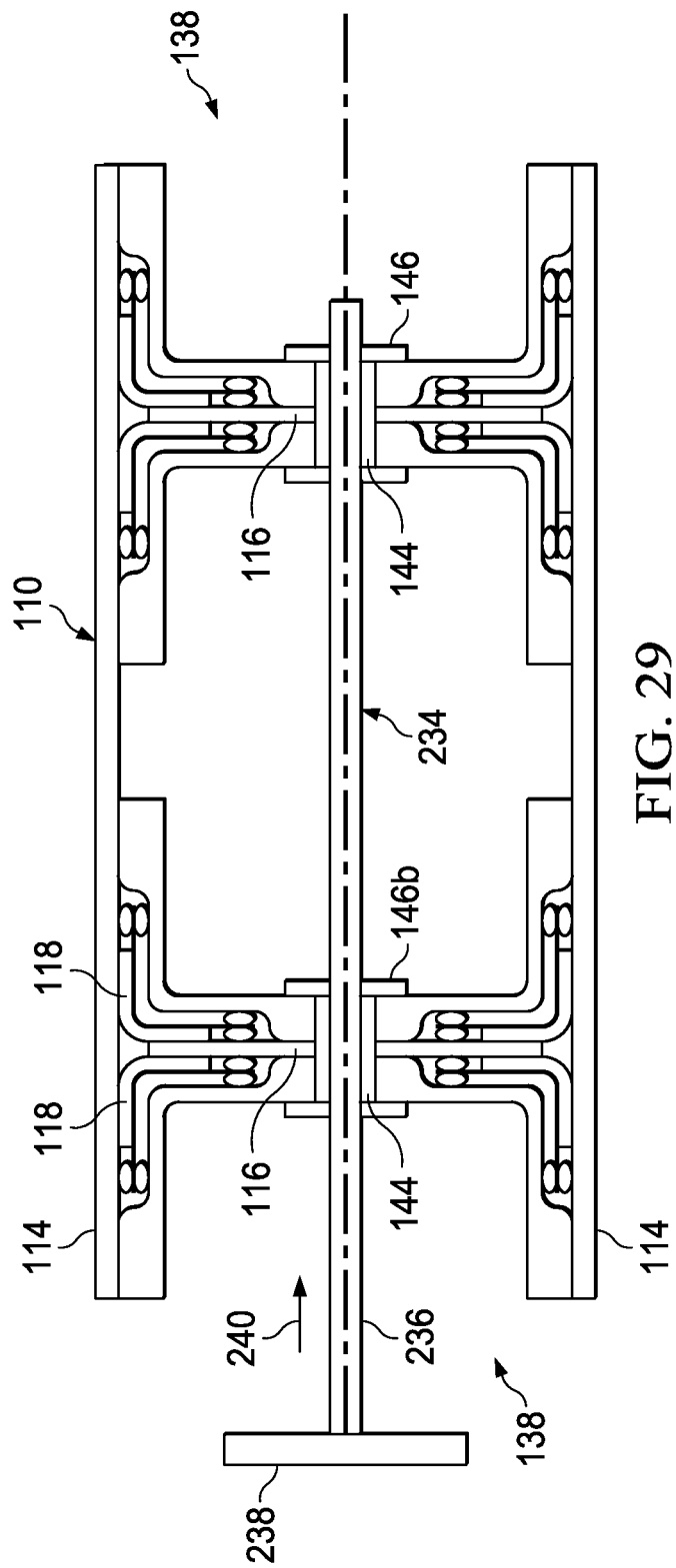
FIG. 29 is an illustration of a cross sectional view of the airfoil box, showing a disassembly tool being inserted into the internal tools.
Figure 30:
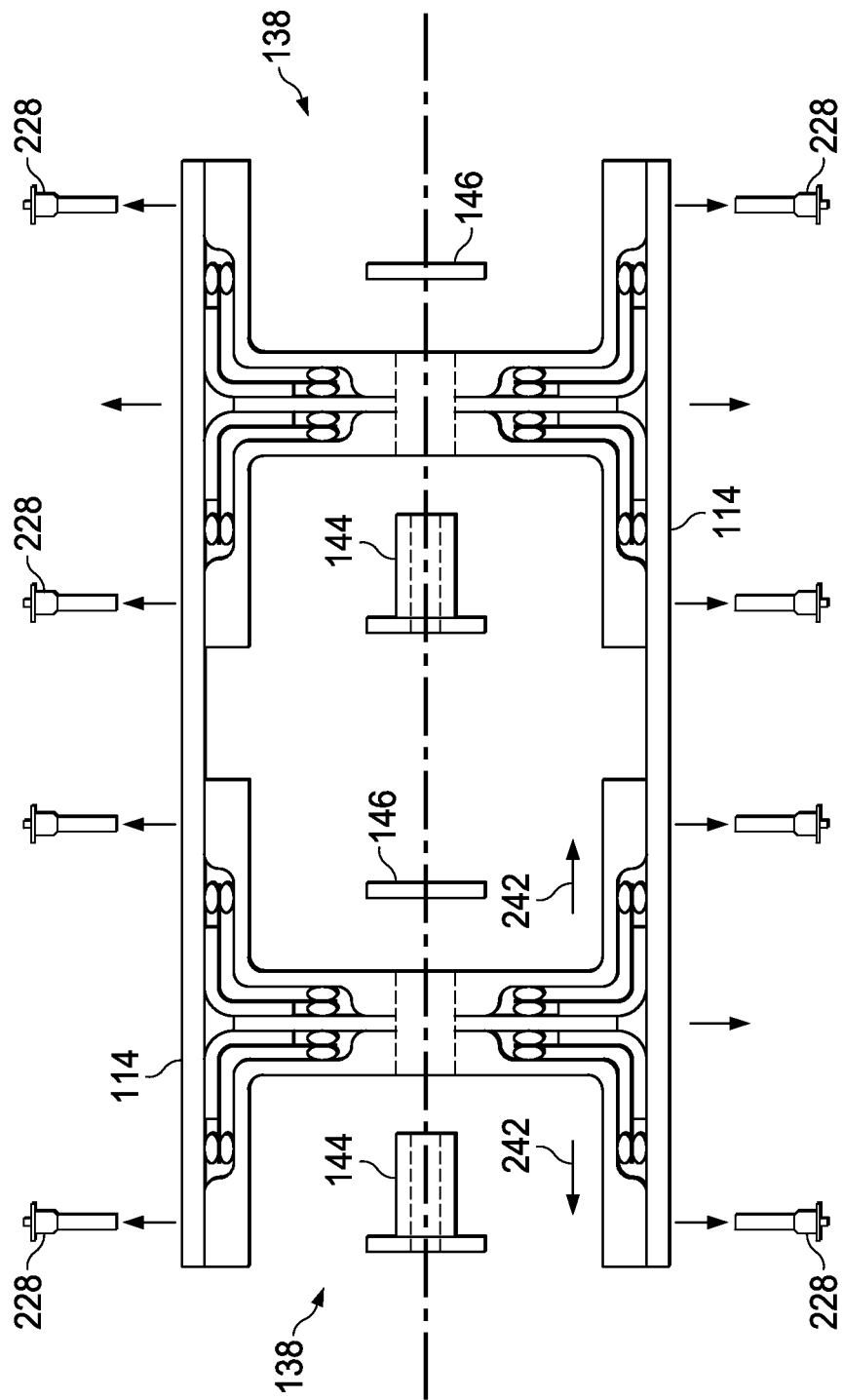
FIG. 30 is an illustration similar to FIG. 29 showing the disassembly tool having been removed and the clamping sleeves having been released from the internal tools.
Figure 31:
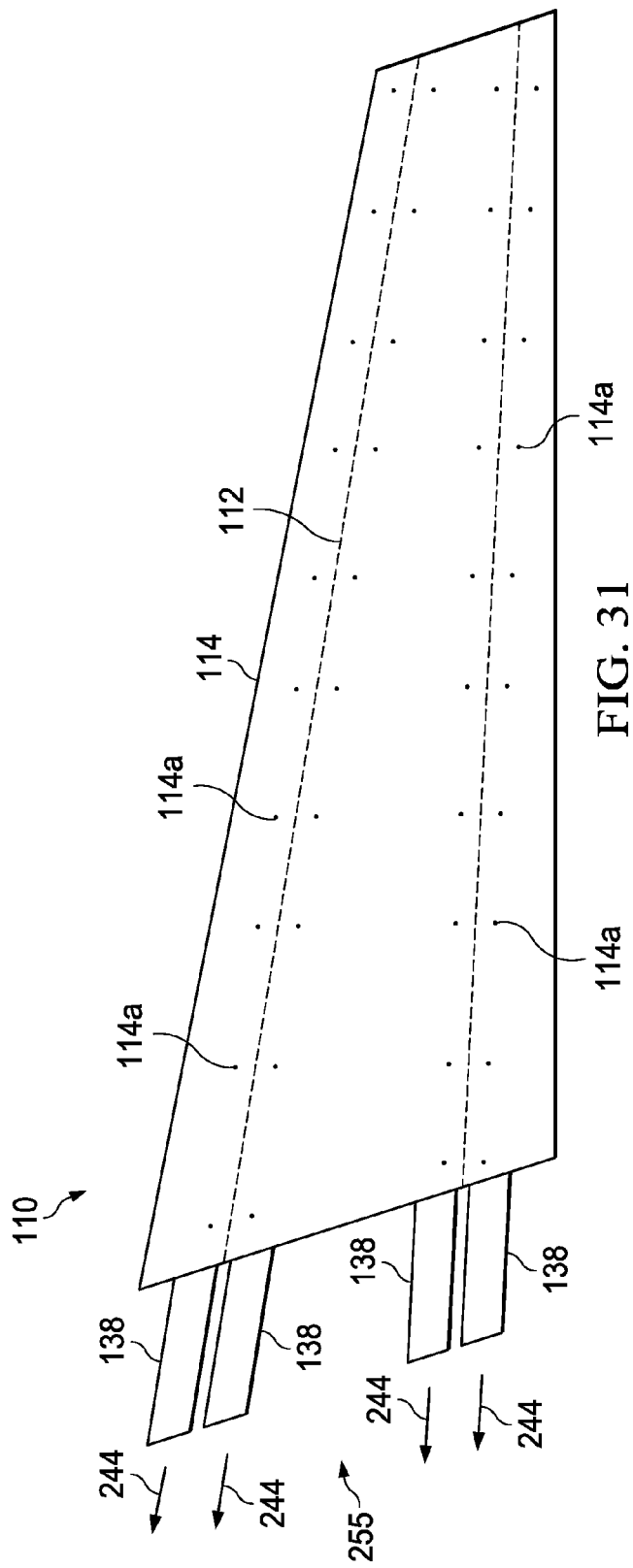
FIG. 31 is an illustration of a plan view of the airfoil box as the internal tools are being removed therefrom.
Figure 37:
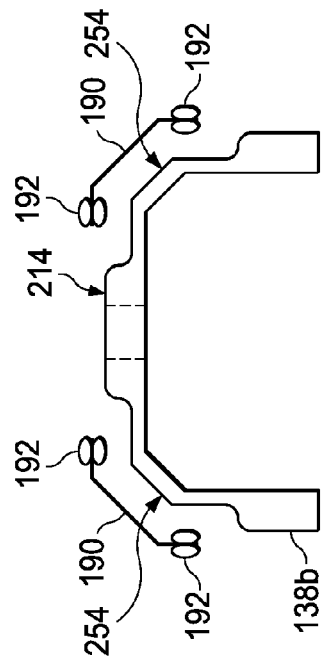
FIG. 37 is an illustration of a cross section of an alternate form of the lower portion of an internal tool adapted to be used with the chord compaction tool shown in FIG. 32.

Referring now to FIG. 29, the internal tools 138 may be removed from the completed airfoil box 110 by inserting 240 the shank 236 of a disassembly tool 234 through the clamping sleeves 144. The disassembly tool 234 may include a handle 238 that may be rotated to unlock and release the clamping sleeve collars 146*b*. As shown in FIG. 30, with the clamping sleeve collars 146 released, the clamping sleeves 144 may be disassembled and removed from the internal tools 138 using the disassembly tool 234. The pins 228 are removed to unfasten the skins 114 from the internal tools 138, allowing the internal tools 138 to be withdrawn 244 through the inboard end 255 of the airfoil box 110, as shown in FIG. 31. Depending on the application, some degree of draft (not shown) may be provided between the internal tools 138 and the IML 115 of the skin 114 to facilitate removal of the internal tools 138. The vacuum bags 190 may also be removed and withdrawn 244 through the inboard end 255. Following removal of the pins 228, the holes 114*a* (FIG. 22) may be filled with suitable fasteners or a filler (not shown). Optionally, the ends (not shown) of the spar chords 118 may need to be trimmed after the internal tools 138 are removed.

Depending on the application, it may be necessary or desirable to apply additional compaction pressure to the spar chords 118 as they are being assembled onto the spar webs 116 and/or during final cure. In such applications, a chord compaction tool shown in FIG. 32 may be employed to apply direct compaction pressure to each of the green spar chords 118. FIGS. 33-36 illustrate an alternate form of a compaction tool assembly 245 similar to the compaction tool assembly 165 shown in FIGS. 9-12, which employs the chord compaction tool 246. The compaction tool assembly 245 includes upper and lower forming blocks 170, 172 and side forming blocks 176, 178, along with four of the chord compaction tools 246. The chord compaction tools 246 are received within the preformed spar chords 118 and each include an outer radiused corner 246*a* (FIG. 34) which may assist in more fully forming and compacting the inside radius of the spar chord 118. Each of the chord compaction tools 246 further includes a beveled side 246*b* to which pressure is applied by bevels 170*a*, 172*a* on the top and bottom forming blocks 170, 172, respectively.

Figure 38:
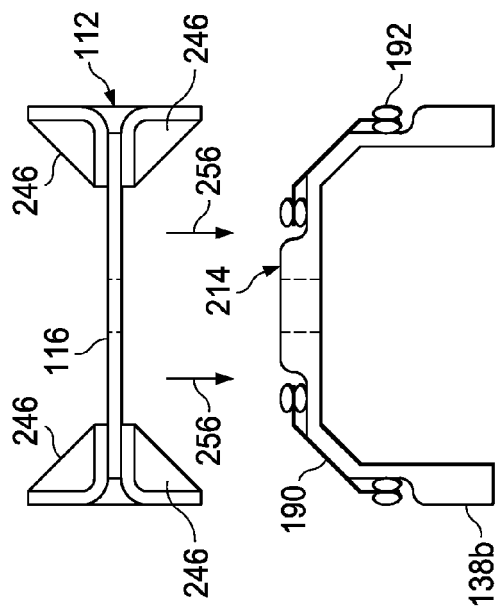
FIG. 38 is an illustration similar to FIG. 37 but showing the assembled spar of FIG. 36 being loaded onto the lower portion of the internal tool shown in FIG. 37.
Figure 36:
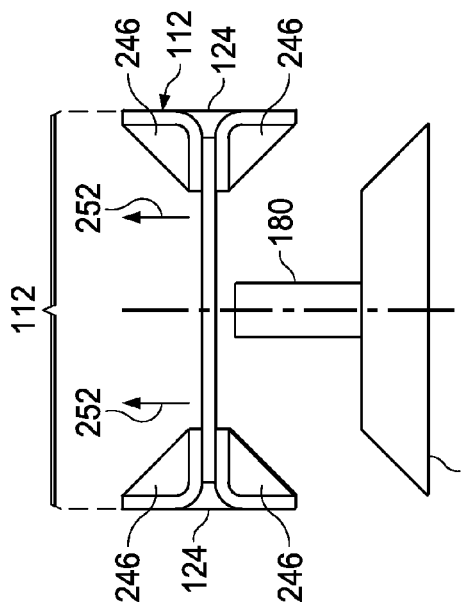
Figure 40:
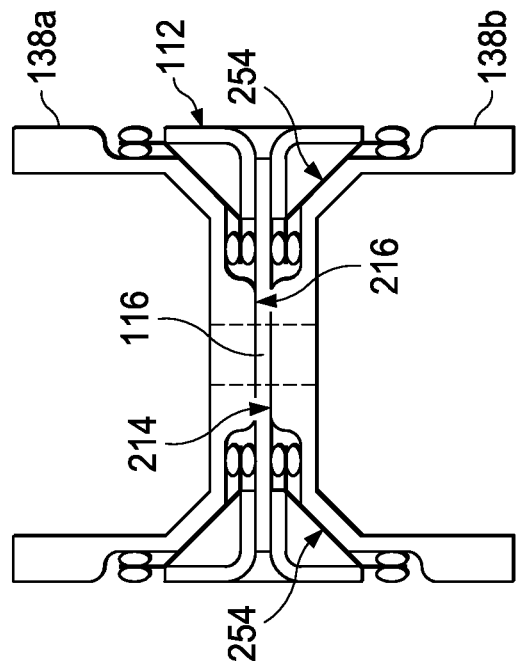
FIG. 40 is an illustration similar to FIG. 39 but showing the internal tool fully assembled over the spar.
Figure 39:
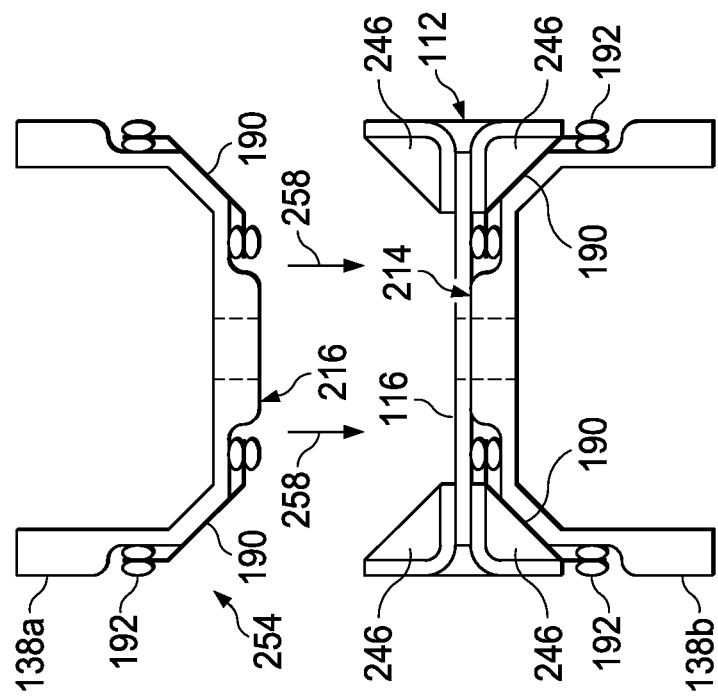
FIG. 39 is an illustration similar to FIG. 38 but showing the upper portion of the internal tool being loaded onto the spar.

Following compaction of the spar 112 illustrated in FIG. 34, the top forming block 170 is lifted away 248 and the side forming blocks 176, 178 are separated 250 as shown in FIG. 35, allowing the spar 112 to be lifted away 252 from the bottom forming block 172, as illustrated in FIG. 36. The chord compaction tools 246 may remain assembled with the spar 112 when the compacted spar 112 is lifted away 252 from the bottom forming block 172 and transferred to the lower portion 138*b* of the internal tool illustrated in FIGS. 37-40. The upper and lower internal tool portions 138*a*, 138*b* shown in FIGS. 37-40 are similar to those previously described in connection with FIGS. 13-20 however, in this example, each of the internal tool portions 138*a*, 138*b* includes a beveled corner 254 which is adapted to engage the beveled side 246*b* (FIG. 32) of the chord compaction tools 246. After the spar 112 is loaded onto the lower internal tool portion 138*b* as shown in FIG. 38, the upper internal tool portion 138*a* is loaded on to the spar 112, as shown in FIG. 39. Following this assembly process, spar web 116 is clamped between the opposing surfaces 214, 216 of the upper and lower tool portions 138*a*, 138*b*, respectively as shown in FIG. 40.

Figure 41:
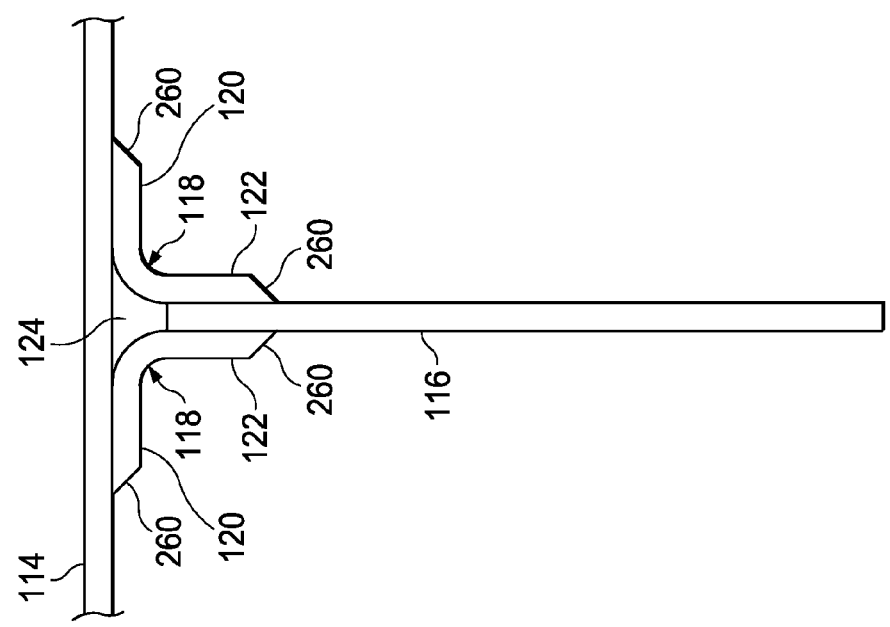
FIG. 41 is an illustration of a cross sectional view of an alternate form of the spar chords having trimmed ends.

Referring now to FIG. 41, in some applications, compaction pressure applied to the spar chords 118 may undesirably distort reinforcement fibers at the outer ends of the flanges 120, 122. In order to avoid such fiber distortion and assure more evenly applied pressure to the ends of the spar chords 118, the outer edges 260 of the flanges 120, 122 may be trimmed with a taper after the spar chords 118 are pre-formed in their green state in the process previously described in connection with FIGS. 7A-7D.

Figure 43:
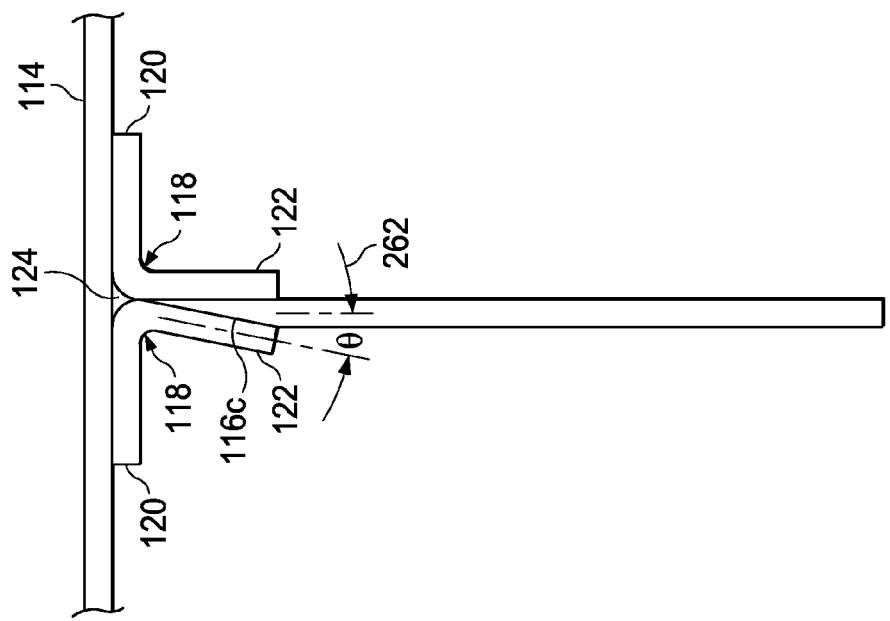
FIG. 43 is an illustration similar to FIG. 41 but with untrimmed chord ends and showing use of the spar web of FIG. 42.
Figure 42:
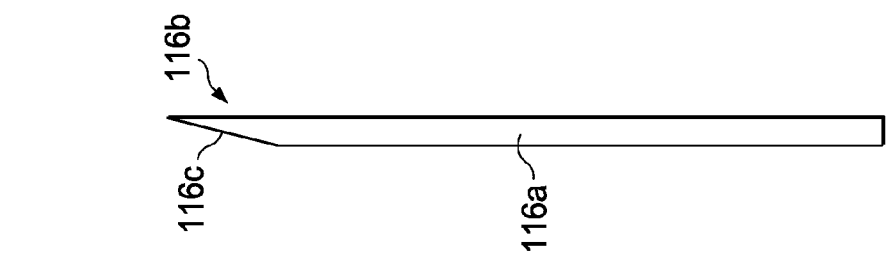
FIG. 42 is an illustration of an end of a spar web tapered along one side.

FIGS. 42 and 43 illustrate an alternate form of the spar 112, in which one side of each outer end 116*b* of the spar web 116*a* is tapered at 116*c*. In this example, the flange 122 of one of the spar chords 118 is inclined at an angle θ relative to the central axis 262 of the spar web 116*a* in order to lie flush with the taper 116*c* on the spar web 116*a*.

Figure 44:
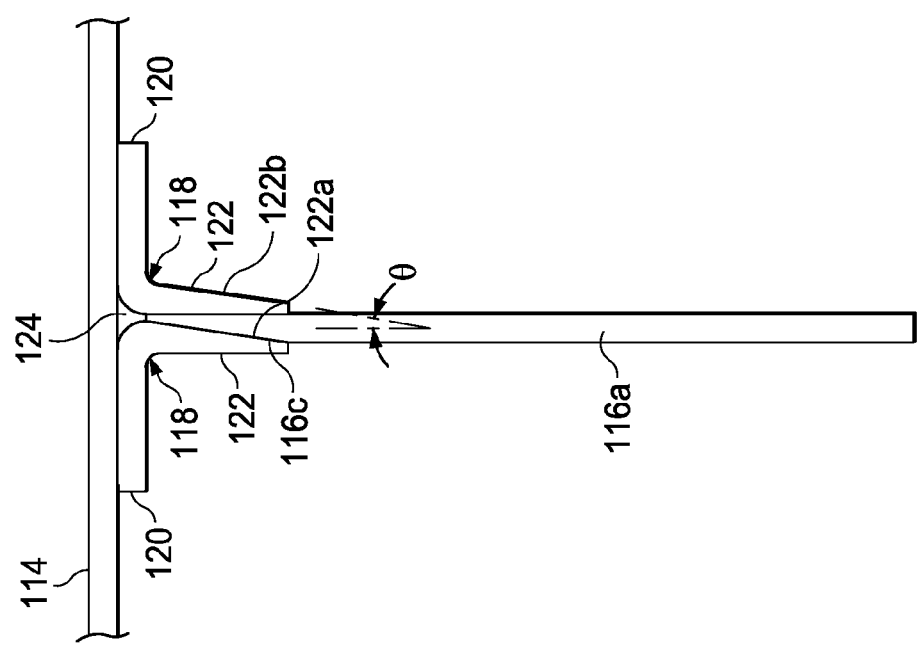
FIG. 44 is an illustration similar to FIG. 43 but showing the use of a spar chord having one flange with an internal taper matching the taper of the spar web shown in FIG. 42.

FIG. 44 illustrates another embodiment of the spar 112 similar to that shown in FIG. 43, however in this example, the outer side 122*b* of flange 122 is tapered at an angle θ substantially identical to the tapered inner side 122*a* of the opposing flange 122.

Figure 45:
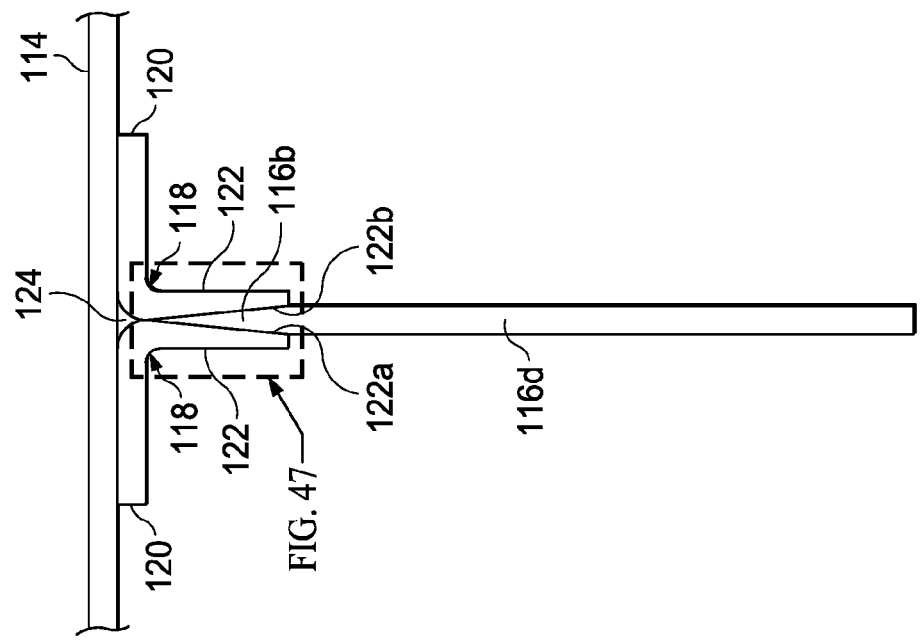
FIG. 45 is an illustration similar to FIG. 44 but showing a spar web with a symmetrically tapered end and spar chords internally tapered to match taper of the spar web.
Figure 47:
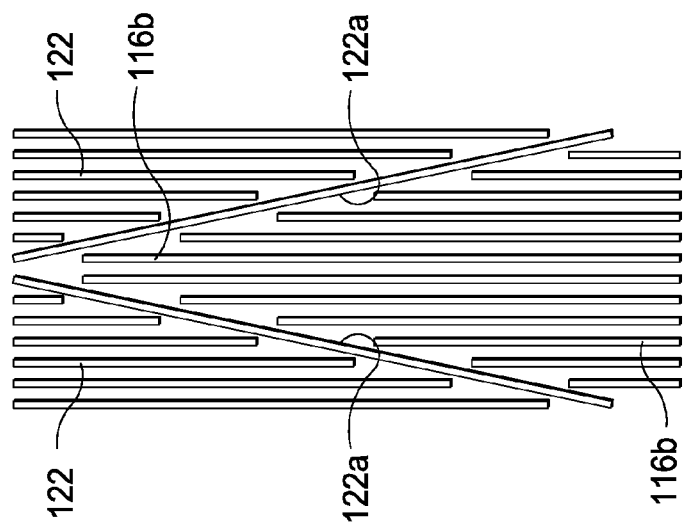
FIG. 47 is an illustration of the area designated as FIG. 47 in FIG. 45.
Figure 46:
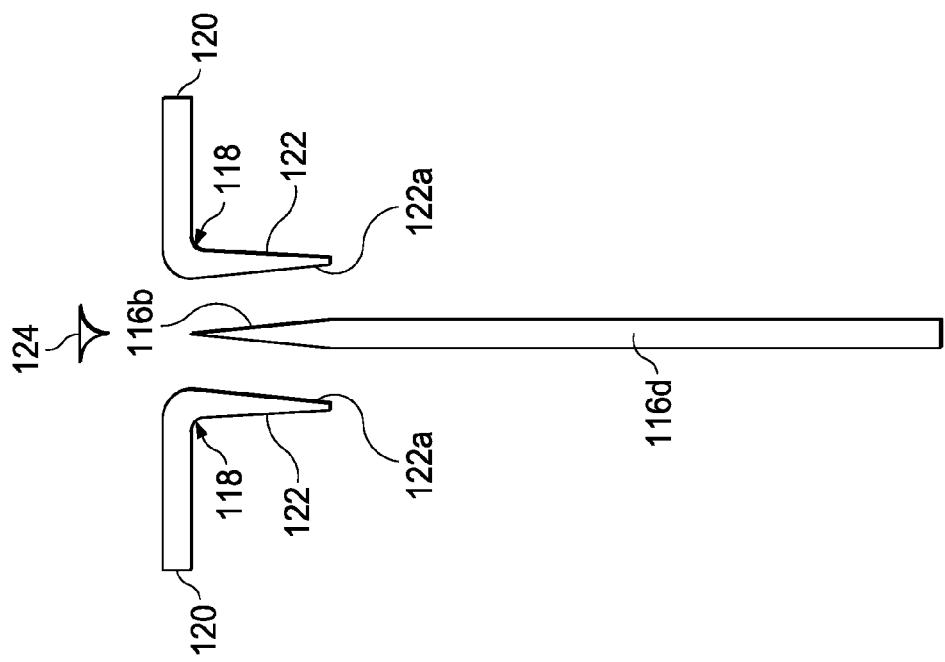
FIG. 46 is an illustration of the components shown in FIG. 45, in exploded form.

FIGS. 45-47 illustrate still another embodiment of a spar 112. In this example, the outer end 116*b* of the spar web 116*b* is symmetrically doubled-tapered to substantially match the tapered inner sides 122*a* of each of the flanges 122.

Figure 48:
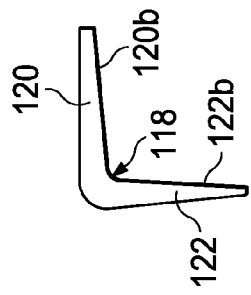
FIG. 48 is an illustration of another embodiment of a spar chord having externally tapered flanges.

FIG. 48 illustrates another variation of the spar chord 118 in which the outer sides 120*b*, 122*b* of the flanges 120, 122 are each inwardly tapered.

Figure 49:
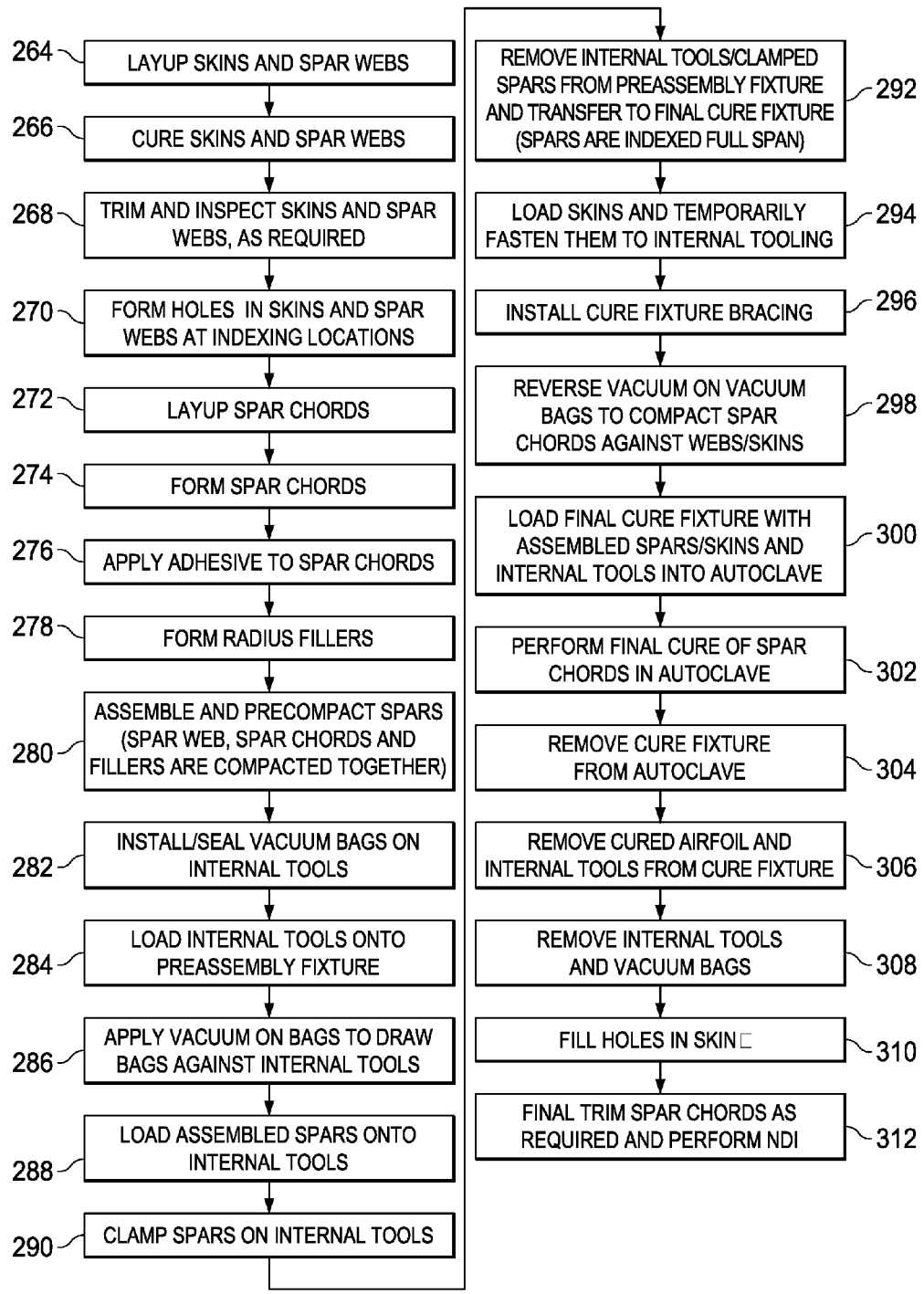
FIG. 49 is an illustration of a flow diagram showing additional details of the method of fabricating airfoil.

Attention is now directed to FIG. 49 which illustrates additional details of the method of fabricating an airfoil, discussed previously. At 264, the skins 114 and spar webs 116 are laid up and then cured at 266. At 268 the skins 114 and the spar webs 116 may be trimmed, and inspected as necessary. At 270, indexing holes 114*a* may be formed in the skins and the spar webs at indexing locations. At 272, the spar chords 118 are laid up and at 274 the spar chords 118 are formed to the desired cross sectional shape. At 276, adhesive may be applied to the spar chords 118, and at 278, radius fillers 124 may be formed. At 280, the spars 112, comprising the spar web 116, spar chords 118 and fillers 124 are assembled and compacted together. At 282, strip vacuum bags 190 are installed and sealed on the internal tools 138, and at 284, the internal tools 138 are loaded onto a preassembly fixture 200.

At 286, a vacuum is applied to the vacuum bags 190 which draw the bags against the internal tools 138. At 288, the preassembled spars 112 are loaded onto the internal tools 138 and at 290, the spars 112 are clamped to the internal tools 138. At 292, the combination of the clamped spars 112 and the internal tools 138 are removed from the preassembly fixture and are transferred to a cure fixture 140, where the spars 12 are indexed along their entire span. At step 294, the skins 114 are temporarily fastened to the internal tools 138. Next, at 296, bracing 152 may be optionally installed on the cure fixture 140, and at 298, the vacuum on the vacuum bags 190 is reversed, thereby compacting the spar chords 118 against the skins 114 and the spar webs 116.

At 300, the cure fixture 140 along with the assembled spars 112 and skins 114 are loaded into an autoclave or similar curing oven, and at 302 the spar chords 118 are cured. At 304, the cure fixture 140 is removed from the autoclave or oven, and at 306, the cured airfoil box 110 is removed from the cure fixture 140. At 308, the internal tools 138 and the vacuum bags 190 are removed from the cured airfoil box 110, and at 310 the indexing holes 114a in the skin 114 are filled with fasteners or a filler. Finally, at 312, the spar chords 118 may be final trimmed as required and the airfoil box 110 may be nondestructively inspected.

Referring now to FIGS. 50 and 51, embodiments of the disclosure may be employed in the context of an aircraft manufacturing and service method 314 as shown in FIG. 50 and aircraft 316 as shown in FIG. 50. Turning first to FIG. 50, an illustration of an aircraft manufacturing and service method 314 is depicted in accordance with an advantageous embodiment. During pre-production, aircraft manufacturing and service method 314 may include specification and design 318 of aircraft 316 in FIG. 51 and material procurement 320.

During production, component and subassembly manufacturing 322 and system integration 324 of aircraft 316 in FIG. 51 takes place. Thereafter, aircraft 316 in FIG. 51 may go through certification and delivery 326 in order to be placed in service 328. While in service 328 by a customer, the aircraft 316 in FIG. 51 is scheduled for routine maintenance and service 330, which may include modification, reconfiguration, refurbishment, and other maintenance or service.

Each of the processes of aircraft manufacturing and service method 314 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 51, an illustration of an aircraft 316 is depicted in which an advantageous embodiment may be implemented. In this example, aircraft 316 is produced by aircraft manufacturing and service method 314 in FIG. 50 and may include airframe 332 with plurality of systems 334 and interior 336. Examples of systems 334 include one or more of propulsion system 338, electrical system 340, hydraulic system 342, and environmental system 344. Any number of other systems may be included. Although an aerospace example is shown, different advantageous embodiments may be applied to other industries, such as the marine and automotive industries.

Apparatuses and methods embodied herein may be employed during at least one of the stages of aircraft manufacturing and service method 314 in FIG. 50. In one illustrative example, components or subassemblies produced in component and subassembly manufacturing 322 in FIG. 50 may be fabricated or manufactured in a manner similar to components or subassemblies produced while aircraft 316 is in service 328 (FIG. 50). As yet another example, a number of apparatus embodiments, method embodiments, or a combination thereof may be utilized during production stages, such as component and subassembly manufacturing 322 and system integration 324 in FIG. 50. A number, when referring to items, means one or more items. For example, a number of apparatus embodiments is one or more apparatus embodiments. A number of apparatus embodiments, method embodiments, or a combination thereof may be utilized while aircraft 326 is in service 328 and/or during maintenance and service 330 in FIG. 50. The use of a number of the different advantageous embodiments may substantially expedite the assembly of and/or reduce the cost of aircraft 316.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating an airfoil, comprising:
   making a pair of cured composite skins;
   making at least one spar, including assembling uncured spar chords and at least one cured composite spar web;
   assembling the cured skins to the spar; and
   curing the spar chords.

2. The method of claim 1, further comprising:
   compacting the spar chords against the cured skins.

3. The method of claim 1, wherein assembling the skins and the spar includes:
   holding the spar web and the spar chords in a tool, and
   mounting the skins on the tool with an inner mold line of each of the skins in proximity to the spar chords.

4. The method of claim 3, wherein holding the spar web and the spar chords in the tool includes:
   adhering the spar chords to the spar web, and
   clamping the spar web in the tool.

5. The method of claim 3, wherein assembling the cured skins and the spar includes:
   forming holes in each of the skins, and
   removably mounting the skins on the tool by inserting pins through the holes into the tool.

6. The method of claim 4, wherein assembling the cured skins and the spar includes indexing the spar relative to the cured skins by mounting the tool on indexing rods.

7. The method of claim 2, wherein:
   assembling the skins and the spar includes holding the spar web and the spar chords in a tool, and mounting the skins on the tool with an inner mold line of each of the skins in proximity to the spar chords, and
   compacting the spar chords against the skins is performed by installing vacuum bags on the tool respectively covering the spar chords, and evacuating the vacuum bags.

8. The method of claim 1, wherein assembling the cured skins and the spar includes:

placing a tool on an assembly fixture, assembling the cured spar web and the uncured spar chords on the tool, and transferring the tool having the assembled spar web and spar chords to a cure fixture.

9. The method of claim 1, wherein assembling the uncured spar chords and at the least one cured composite spar web includes pre-compacting the spar chords against the at least one uncured spar web.

10. The method of claim 9, wherein the pre-compacting includes:

placing chord compaction tools respectively against the spar chords, and compacting of the chord compaction tools respectively against the spar chords.

11. The method of claim 10, wherein:

assembling the skins and the spar includes transferring the spar and the spar compaction tools to an internal tool, and mounting the skins on the internal tool with an inner mold line of each of the skins in proximity to the spar chords, and curing the spar chords includes using the spar compaction tools to compact the spar chords against the skin and the at least one spar web.

12. A method of fabricating an airfoil box, comprising:

providing a pair of cured composite skins each having a span;

assembling at least one composite spar, including attaching uncured composite spar chords to a cured composite spar web;

holding the spar and the cured skins in an assembled, indexed relationship to each other along the span; and bonding the spar to the cured composite skins by curing the uncured composite spar chords.

13. The method of claim 12, further comprising:

generating a compaction force compacting the spar chords against the spar web and the skins as the spar chords are being cured.

14. The method of claim 13, wherein compacting the spar chords includes:

installing vacuum bags respectively over the spar chords, and evacuating each of the vacuum bags.

15. The method of claim 13, wherein the skins and the spar webs are used to react the compaction force.

16. The method of claim 12, wherein assembling the spar includes:

laying up and curing the composite spar web, laying up and forming the composite spar chords, applying an adhesive to one of the spar web and the spar chords, assembling the spar web and the spar chords together, and compacting the spar web and the spar chords together.

17. The method of claim 12, further comprising:

assembling the spar and the skins, including placing the assembled spar in a tool, attaching the skins to the tool, and transferring the assembled skins and spar to a cure fixture.

18. The method of claim 17, wherein the curing is performed by:

placing the cure fixture in an autoclave, and subjecting substantially only the spar chords to autoclave pressure.

* * * * *